(12) United States Patent
Crian et al.

(10) Patent No.: US 7,497,677 B1
(45) Date of Patent: *Mar. 3, 2009

(54) MOLD HAVING MODULAR SUBMOLD

(75) Inventors: Stephen B. Crian, Cape Girardeau, MO (US); Christopher T. Moore, Creal Springs, IL (US)

(73) Assignee: Crain Enterprises, Inc., Mound City, IL (US)

( * ) Notice: Subject to any disclaimer, the term of this patent is extended or adjusted under 35 U.S.C. 154(b) by 469 days.

This patent is subject to a terminal disclaimer.

(21) Appl. No.: 10/936,268

(22) Filed: Sep. 8, 2004

Related U.S. Application Data

(60) Provisional application No. 60/501,587, filed on Sep. 8, 2003.

(51) Int. Cl.
*B29C 33/30* (2006.01)
(52) U.S. Cl. .................. 425/185; 425/190; 425/192 R
(58) Field of Classification Search .............. 425/190, 425/191, 192 R, 195, DIG. 239, DIG. 247, 425/185
See application file for complete search history.

(56) References Cited

U.S. PATENT DOCUMENTS

| | | | |
|---|---|---|---|
| 1,191,637 A | 7/1916 | Whiteley, Jr. | |
| 2,424,235 A | 7/1947 | Hoffer | |
| 2,485,283 A * | 10/1949 | Guelph | 425/444 |
| 2,733,479 A | 2/1956 | English | |
| 3,044,121 A | 7/1962 | Wiskoff et al. | |
| 3,048,894 A | 8/1962 | Gora | |
| 3,103,705 A | 9/1963 | Letica | |
| 3,449,815 A | 6/1969 | Jones | |
| 3,594,869 A * | 7/1971 | Sher | 425/192 R |
| 3,871,611 A | 3/1975 | Taketa | |
| 4,009,979 A | 3/1977 | Martin | |
| 4,034,951 A | 7/1977 | Sokoloski | |
| 4,126,292 A | 11/1978 | Saeki et al. | |
| 4,151,976 A | 5/1979 | Schurman | |
| 4,158,910 A | 6/1979 | Hanas et al. | |
| 4,202,522 A | 5/1980 | Hanas et al. | |
| 4,330,248 A | 5/1982 | Platte | |
| 4,337,027 A | 6/1982 | Montieth | |
| 4,416,604 A * | 11/1983 | Bender et al. | 425/183 |
| 4,452,419 A | 6/1984 | Saleeba | |
| 4,544,340 A | 10/1985 | Hehl | |

(Continued)

FOREIGN PATENT DOCUMENTS

EP 0 414 615 A1 2/1991

OTHER PUBLICATIONS

Abbeon Cal, Inc., High Quality, Proven, Tested Degating Fixtures, http://www.abbeon1.com/adf01/degatfix.html, Oct. 27, 2003, 3 pp., Santa Barbara, California, United States.

(Continued)

*Primary Examiner*—Philip C Tucker
*Assistant Examiner*—Dimple N Bodawala
(74) *Attorney, Agent, or Firm*—Senniger Powers LLP

(57) ABSTRACT

A mold can be receive mold inserts or submolds for customized configuration of the mold. In addition, the submolds can be specially configured for use. The same submold can be changed for a different use. Also, the submold can be reconfigured for use after the submold has been reconditioned. Moreover, the submolds make efficient use of materials within the mold by having many parts that are capable of reuse.

8 Claims, 29 Drawing Sheets

U.S. PATENT DOCUMENTS

| | | | |
|---|---|---|---|
| 4,551,084 | A | 11/1985 | Lake |
| 4,552,522 | A | 11/1985 | Van Melle |
| 4,620,958 | A | 11/1986 | Wiechard |
| 4,708,314 | A | 11/1987 | Kühling |
| 4,761,343 | A | 8/1988 | Gellert |
| 4,828,479 | A | 5/1989 | Pleasant |
| 4,861,254 | A | 8/1989 | Takeuchi et al. |
| 4,867,668 | A | 9/1989 | Miyairi |
| 4,901,503 | A | 2/1990 | Gomez et al. |
| 4,909,725 | A | 3/1990 | Ward |
| 4,911,632 | A | 3/1990 | Mansfield |
| 4,959,002 | A | 9/1990 | Pleasant |
| 4,965,028 | A | 10/1990 | Maus et al. |
| 5,114,330 | A * | 5/1992 | Nielsen ............... 425/193 |
| 5,208,053 | A | 5/1993 | Vandenberg |
| 5,255,889 | A | 10/1993 | Collette et al. |
| 5,282,733 | A * | 2/1994 | Noritake et al. ........ 425/183 |
| 5,297,772 | A | 3/1994 | Stefanick |
| 5,411,699 | A | 5/1995 | Collette et al. |
| 5,542,837 | A | 8/1996 | Johnston |
| 5,552,995 | A | 9/1996 | Sebastian |
| 5,562,935 | A * | 10/1996 | Martin ............... 425/552 |
| 5,571,539 | A | 11/1996 | Starkey |
| 5,660,782 | A | 8/1997 | Davis |
| 5,711,971 | A | 1/1998 | vanderSanden |
| 5,731,013 | A | 3/1998 | vanderSanden |
| 5,736,168 | A | 4/1998 | Goyal et al. |
| 5,783,224 | A | 7/1998 | Heinlen et al. |
| 5,824,249 | A | 10/1998 | Leitch et al. |
| 5,849,236 | A | 12/1998 | Tatham |
| 5,882,695 | A * | 3/1999 | Starkey ............... 425/168 |
| 5,906,776 | A | 5/1999 | Gupta |
| 5,922,264 | A | 7/1999 | Shimmell |
| 5,971,734 | A * | 10/1999 | Moon ................ 425/121 |
| 6,065,950 | A | 5/2000 | Spiess |
| 6,077,470 | A | 6/2000 | Beaumont |
| 6,116,888 | A | 9/2000 | Johnston et al. |
| 6,196,824 | B1 * | 3/2001 | Foltuz et al. ........... 425/190 |
| 6,196,830 | B1 | 3/2001 | Foltuz et al. |
| 6,206,674 | B1 | 3/2001 | Foltuz et al. |
| 6,308,929 | B1 | 10/2001 | Wieder |
| 6,319,446 | B1 | 11/2001 | Bettencourt |
| 6,328,552 | B1 * | 12/2001 | Hendrickson et al. ..... 425/188 |
| 6,350,222 | B2 | 2/2002 | Susnjara |
| 6,450,798 | B1 | 9/2002 | Choi et al. |
| 6,532,694 | B1 * | 3/2003 | Gathright ............. 43/42.53 |
| 6,558,145 | B2 | 5/2003 | Wieder |
| 6,571,145 | B1 | 5/2003 | Matsumiya et al. |
| 6,575,723 | B2 | 6/2003 | Ondrejka |
| 6,701,200 | B1 | 3/2004 | Lukis et al. |
| 6,779,175 | B2 | 8/2004 | Susnjara |
| 6,780,362 | B1 | 8/2004 | Story |
| 7,108,498 | B2 * | 9/2006 | Lai .................. 425/190 |
| 7,143,492 | B2 | 12/2006 | Chen |
| 7,204,685 | B1 * | 4/2007 | Crain et al. ........... 425/185 |
| 7,241,405 | B1 * | 7/2007 | Crain et al. ........... 264/39 |
| 2002/0018825 | A1 | 2/2002 | Starkey |
| 2002/0055797 | A1 | 5/2002 | Susnjara et al. |
| 2003/0018408 | A1 | 1/2003 | Sagae et al. |
| 2003/0055525 | A1 | 3/2003 | Graham |
| 2003/0068401 | A1 | 4/2003 | Persson |
| 2003/0126038 | A1 | 7/2003 | Lukis et al. |
| 2003/0132553 | A1 | 7/2003 | Wilsterman et al. |
| 2003/0171841 | A1 | 9/2003 | Porter et al. |
| 2004/0128019 | A1 | 7/2004 | Ikeda et al. |
| 2006/0277753 | A1 | 12/2006 | Ntsama-Etoundi |

OTHER PUBLICATIONS

Abbeon Cal, Inc., Square Type Air Nippers, http://www.abbeon1.com/newFiles/squaretypnip.html, Oct. 27, 2003, 3 pp., Santa Barbara, California, United States.

Abbeon Cal, Inc., Vertical-Type Slide-off Air Nipper, http://www.abbeon1.com/newFiles/vertairnip.html, Oct. 27, 2003, 4 pp., Santa Barbara, California, United States.

A D-M-E, New Products Bulletin, Master Unit Die Products, Inc., 3 pp., Greenville, MI, United States.

Cole, Kevin, Reconfigure It Out, Cutting Tool Engineering Magazine, Sep. 2004, 3 pp., vol. 56, No. 9.

Goldsberry, Clare, Can Aluminum Molds Compete?, Injection Molding, Sep. 2003, 2 pp., Rochester, New York, United States.

Kirkland, Carl, Injection Molding Magazine, http://www.immnet.com/articles?article=2292, Dec. 2003, 5 pp., Rochester, New York, United States.

Master Unit Die, Master Unit Die Quick-Change™ Systems . . . a cost effective approach to injection molding, http://www.masterunitdie.com, Sep. 9, 2004, 2 pp., Greenville, Michigan, United States.

RMI, Nutron, Injection Molded Products, 1 pg., not added, Miami, Florida, United States.

RMI Catalog, 6 pp., Jun. 2002, United States.

* cited by examiner

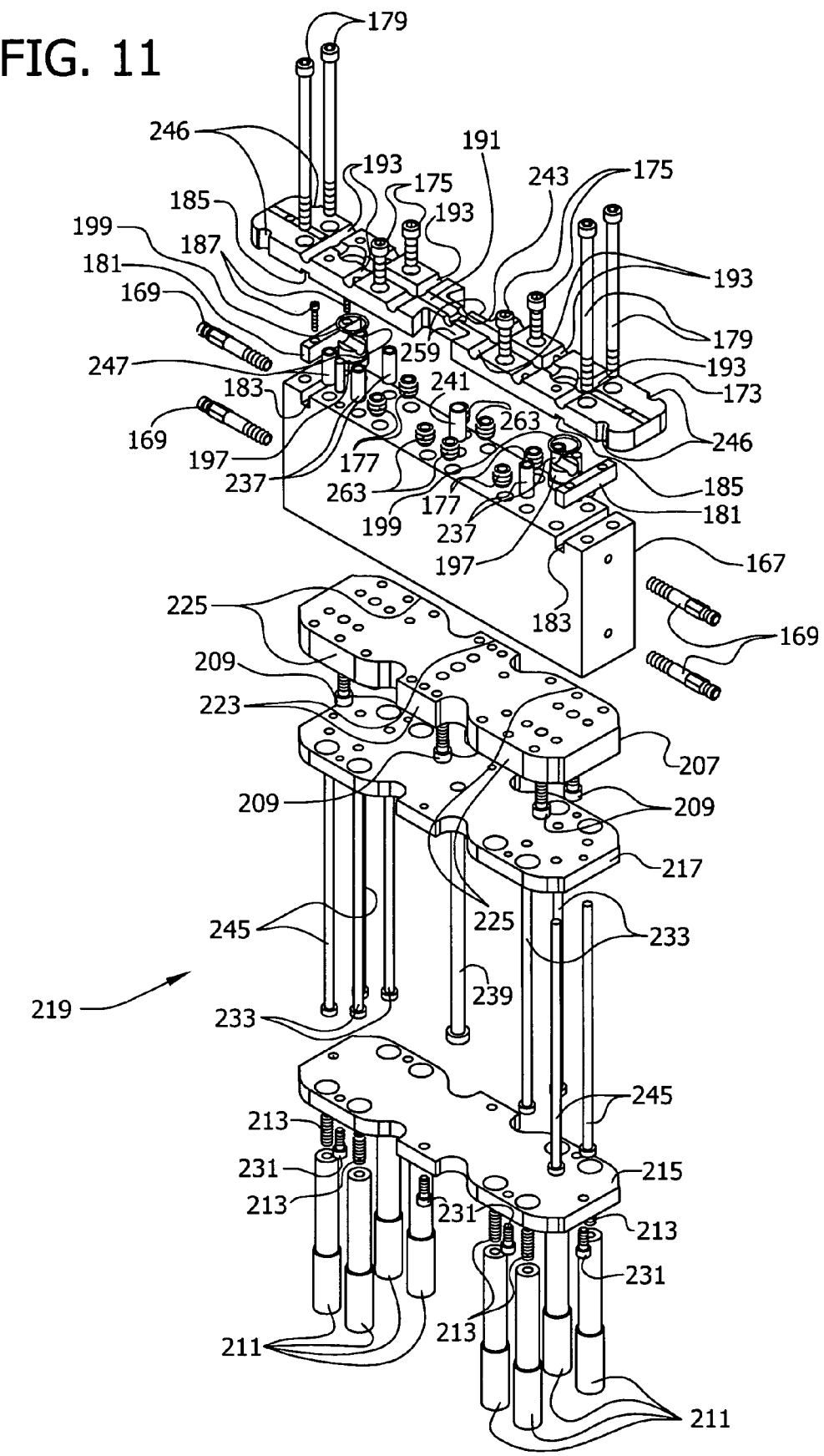

MOLD HAVING MODULAR SUBMOLD

This application claims benefit of 60/501,587, filed on Sep. 8, 2003.

BACKGROUND OF THE INVENTION

This invention relates generally to molding, and more particularly to a modular mold for use in the manufacture and sale of molded objects.

The present invention has particular, but not exclusive, application in the field of molding, which is responsible for the production of many objects and components in numerous consumer and manufacturing markets. One particular application is for plastic injection molding, although other types of molding and casting fall within the scope of the present invention. Plastic injection molding machines have a fixture which receives a mold composed of two or more mold members or plates which are moved by the machine between open and closed positions. The mold members each contain mold cavities of unique geometric shapes, which partially define the shape of the molded objects produced by the mold. In the closed position, the mold plates come together, registering opposing mold cavities and defining one or more enclosed volumes having the shape of the object or component to be produced. The mold plates are secured in the closed position by the molding machine with sufficient force to remain sealed while resisting the expansive force of the mold material during charging of the mold. Liquefied molding material (e.g., plastic) is injected under pressure through a series of runner channels and a port into the enclosed volume, typically filling the available space in the volume. Thermal energy is removed so that the molding material solidifies within the enclosed volume. The mold plates are moved to the open position by the injection molding machine, and the molded object remains with one of the mold plates. An ejector device including ejection pins pushes the object and attached runners (formed by molding material in the runner channels) out of the one mold plate and the machine is ready to cycle again for the production of the next object. Molded objects are separated from runners either during ejection, or during a secondary, post molding operation, with degating being a commonly accepted term for this separation process. In instances of concurrent molding of multiple different objects, a sorting operation is also employed.

Plastic injection molding has enjoyed enormous commercial success because of its ability to produce large numbers of objects and components quickly and at low prices. Indeed, plastic injection molding may be the most prevalent method for the production of plastic objects. However, plastic injection molding has some drawbacks which limit its usefulness and can operate to prevent the introduction of certain types of products into the marketplace because of certain barriers to entry presented by plastic injection molding. More particularly, the mold which is used in the plastic injection molding machine is very costly to manufacture and maintain, requiring skilled artisans to produce and maintain. The cost savings previously mentioned are recognized only when a very great number of objects are manufactured. For products that will be sold in smaller numbers, or products which will be sold in numbers which are uncertain because of the uncertainty of commercial acceptance of the product, the cost of the mold is a large impediment to their production. The purchaser of molded parts is also faced with the dilemma of whether to spend the additional money to produce molds which are more efficient, i.e., as by having numerous cavities in a single mold for simultaneous production of many objects (parallel processing), or run the risk that if the product is needed in higher quantities than originally anticipated, an entirely new mold (or molds) will have to be purchased. This problem arises because the mold selected by the purchaser is strictly dedicated to production of one object (or group of objects) at one level of efficiency. Once constructed, the mold has essentially no flexibility in operation.

It is known that to reduce the financial risk associated with acquisition of an efficient production mold, it is possible to first produce, in a comparatively short time of fabrication, an inefficient, but low cost bridge mold, also known as a prototype mold. The bridge mold is capable of producing a small quantity of molded objects, and thus permit testing of the physical design, as well as market appeal of a molded object prior to committing to the typically larger financial investment and longer fabrication time associated with more efficient production molds. If molded objects produced by a bridge mold are found to be acceptable, the bridge mold may also be utilized to produce limited production quantities of molded objects, bridging the span of time required to fabricate an efficient production mold, and thus permit faster market availability of the molded objects than would be possible if only the final production mold were used for production.

In some instances, bridge molds may be produced by the same highly skilled artisan mold makers who are also employed to make production molds. The artisan mold makers use techniques for making the bridge molds that are similar to those used to fabricate production molds. In these instances of bridge mold fabrication, advantages of speed and economy are realized by compromising attributes of production molds. Such compromises typically include substitution of softer, more easily workable materials such as aluminum, as opposed to harder tool steel. Moreover, additive protective surface coatings for mold and cavity construction are not employed. Furthermore, the total number of mold cavities is typically limited to one for each object to be molded. And typically more primitive, less efficient methods of ejection, thermal regulation, degating and sorting are employed than utilized on production molds. However, even with these previously mentioned fabrication compromises, artisan mold makers are often able to produce complex molded objects which are nearly identical in shape, appearance and mechanical properties to those which will be produced by the final production mold.

Bridge molds produced by artisan mold makers have a number of disadvantages. For one, the cost and time required to fabricate a bridge mold is additive to the cost and time to fabricate the final efficient production mold. Therefore, molding projects utilizing bridge molding processes have higher total mold fabrication costs than molding projects that utilize only production molds. Furthermore, utilization of bridge molds extends the overall time of a molding project, as bridge molds are constructed as a first step, then following analysis and approval of the bridge mold produced prototype-molded objects, fabrication of a production mold may be commenced. While the costs of a bridge mold may be substantially less than a production mold, bridge molds fabricated by artisan mold makers are still quite expensive, owing to the typically high wages earned by artisan mold makers, and to the overall difficulty of hand crafting custom molds, even when employing the various shortcuts previously mentioned.

As an alternative to utilization of artisan mold makers to fabricate bridge molds in the traditional manner, several known systematic methods of mold design and fabrication may be used for the fabrication of bridge molds. In many instances these systematic mold fabrication methods may enable the fabrication of bridge molds faster and more economically than bridge molds fabricated by artisan mold makers. While being faster and less costly to fabricate, molds of these systematic processes contain all of the disadvantages of artisan-fabricated bridge molds. In addition to the disadvantages of the artisan fabricated molds, system constraints found in these systematic methods further limit molded object properties such as surface finish, part geometry and dimensional tolerances, and therefore often lack the capability to meet object design specifications.

Bridge molds, whether fabricated by artisan mold makers or by systematic processes, are subject to additional disadvantages which limit their usefulness. More particularly, these additional disadvantages are found when a bridge mold is utilized to meet interim production requirements, fulfilling market demands while a more efficient production mold is fabricated to replace the bridge mold. One of these disadvantages is that objects produced by an inefficient bridge mold have significantly greater per object production costs, which may offset and erode any profits realized by the earlier market entry facilitated by the bridge mold. Furthermore, the efficiency limitations of a bridge mold are also overall production capacity limitations. If the market success, and subsequent production demands of a molded object exceed the production capacity of the bridge mold, customer orders will go unfulfilled, which may result in customer dissatisfaction, and ultimately difficulty in retaining customers until greater production capacity is provided with the completed fabrication of a production mold. Being of temporary construction, bridge molds are also particularly susceptible to the effects of wear and damage, and as a result typically have short and unpredictable life spans, making them unreliable for production molding, even on an interim basis, as the bridge mold may fail before a production mold is fabricated. The cost risks associated with insufficient production capacity and unreliability of a bridge mold are magnified when the molded objects produced by the mold are a unique component part of product containing many parts. The delivery failure of the one unique part will interrupt the delivery of the entire dependant product, and may result in lost sales of much greater scale than the costs of the individual molded object.

Production molds may be designed to provide different levels of capacity and production efficiency, but these differing levels of capacity and efficiency have associated costs, which typically increase as the level of capacity and efficiency of the mold design is increased. Therefore, design and investment decisions of production molds require an assessment of the total molded object production requirements in order to select the most appropriate level of capacity and efficiency. As previously mentioned, fabrication of bridge molds prior to the design and fabrication of production molds enables a limited assessment of potential market acceptance and demand for molded objects. While production predictions based on market assessments from these bridge molded objects are useful, their accuracy and reliability are limited, as any prediction of future events is speculative. Furthermore, market demand for a particular molded object tends to change throughout the life cycle of the object, typically first growing as the market adopts the object, then declining as its life matures. Therefore, even if an accurate prediction of the overall demand for molded objects were possible, such predictions would still be inaccurate during various segments of the object's life cycle, and as such it is essentially impossible to make a single mold design and investment decision that is optimal for all phases of the molded objects life cycle.

What is needed is a modular mold and modular method of molding capable of providing rapid and economical fabrication of bridge molds that can then be rapidly and economically upgraded and transformed into an efficient production mold, and also capable of meeting variable capacity and efficiency levels.

It is known to provide some additional flexibility in mold making by constructing a mold which is modular. Instead of mold plates that are each monolithic, the plates are formed as frames which are capable of receiving several mold inserts. The mold inserts contain the mold cavities which mate with the mold cavities of corresponding mold inserts to define the mold volumes in the shape of the object or objects to be produced. The mold so configured may produce many of the same object or produce several different objects in a single mold cycle. Using a modular approach, much less material is required to form a mold insert than would ordinarily be required to form the entire mold plate with a cavity. The frame is generic and can receive different arrangements of mold inserts, and so the overall cost of producing a mold can be reduced. However, it is believed that the full potential of modular molds has not been exploited because of marketing methods which are still focused on single use molds.

Moreover, modular molds suffer to a greater degree from a problem which is generally present in plastic injection molding. Although generally considered being an efficient manufacturing process, one of the primary impediments to molding efficiency is the time in which the mold is at rest after the plastic is injected into the mold, waiting for the plastic to solidify. The solidification time is a function of the heat transfer rate out of the mold volume after hot molding material is injected into the mold. The use of mold inserts may exacerbate this problem because there is insufficient contact with adjacent components of the mold to produce the most ideal conductive heat transfer. As a result, the cycle time of the injection molding machine may be increased with a modular mold. Some attempts to resolve this problem have been made, such as by having the mold insert contain its own liquid coolant circulation loop connected to the coolant system of the injection molding machine. However, this requires that the mold insert be larger, increasing its costs and reducing its flexibility of positioning within the mold plate. The fluid connections to the mold insert required every time the mold is reconfigured are complex and a source of manufacturing delay, and mold configurations and designs are limited by the need to provide for such fluid connections. Still further, steel, the common material used in mold manufacture, does not have the most ideal heat transfer characteristics. In addition to transferring heat out of the mold at a lower rate, the heat transfer is not uniform, so that there may be hot and cold spots in the mold. It is known to use aluminum, which has better heat transfer characteristics, but aluminum is less resistant to wear and subject to greater thermal expansion and contraction within the mold.

Another issue associated with existing injection molding molds and process relates to the reconditioning of molds. Over time, the molds (regardless of the type of material from which they are made) will wear to the point that reconditioning is required. Conventionally, skilled craftsmen are employed to perform this task. Reconditioning involves cutting down the mold to remove damage or wear, following by reforming of the cavity and runner channels leading to the cavity. The reconditioning causes the height of the mold to change, which can be particularly problematic if attempted for modular molds where the height and location of the upper surface of the mold inserts must remain the same for all mold cavities to seal.

Still further, the modularity of the mold inserts is limited by the modularity of the runner channels delivering liquefied molding material to the inserts. Conventionally, the runner channels have been as dedicated to a single use as the molds themselves. Providing a modular mold using mold inserts still requires that the liquefied molding material be delivered in some manner to the mold inserts. Presently, these runner channels are dedicated to a particular mold insert, making it difficult to reconfigure the mold. Mold inserts conventionally must be made of the same material so that they have the same thermal expansion in use. Even if made of the same material, mold inserts are more difficult than one piece molds to register with mating mold inserts to form a sealed mold enclosure volume because of problems with accurately positioning removable mold inserts in the mold frame.

SUMMARY OF THE INVENTION

In one aspect of the present invention, a mold member cooperable with at least one other mold member is used for forming a mold capable of receiving fluidized material into the mold for molding objects from said material. The mold member generally comprises a plate defining a mold insert receptacle therein. A mold insert adapted for insertion into the mold insert receptacle comprises a frame and plural mold insert components. At least some of the mold insert components have a cavity therein for receiving fluidized material to mold at least a portion of an object. The mold insert components are adapted for releasable attachment to the frame to form the mold insert.

In another aspect of the present invention, a submold for installation in a mold member of a mold for use in forming part of a molded object generally comprises a mold cavity block. The mold cavity block has at least one mold cavity formed on one face of the cavity block and also has an opposite face. A wall adjacent to and extending from the opposite face of the mold cavity block is capable of engaging the mold member for positioning the mold cavity block within the mold member at a selected height.

Other objects and features of the present invention will be in part apparent an in part pointed out hereinafter.

BRIEF DESCRIPTION OF THE DRAWINGS

FIG. 11 is an exploded perspective of a primary partition;

Corresponding reference characters indicate corresponding parts throughout the several views of the drawings.

DETAILED DESCRIPTION OF THE PREFERRED EMBODIMENTS

Figure 1:
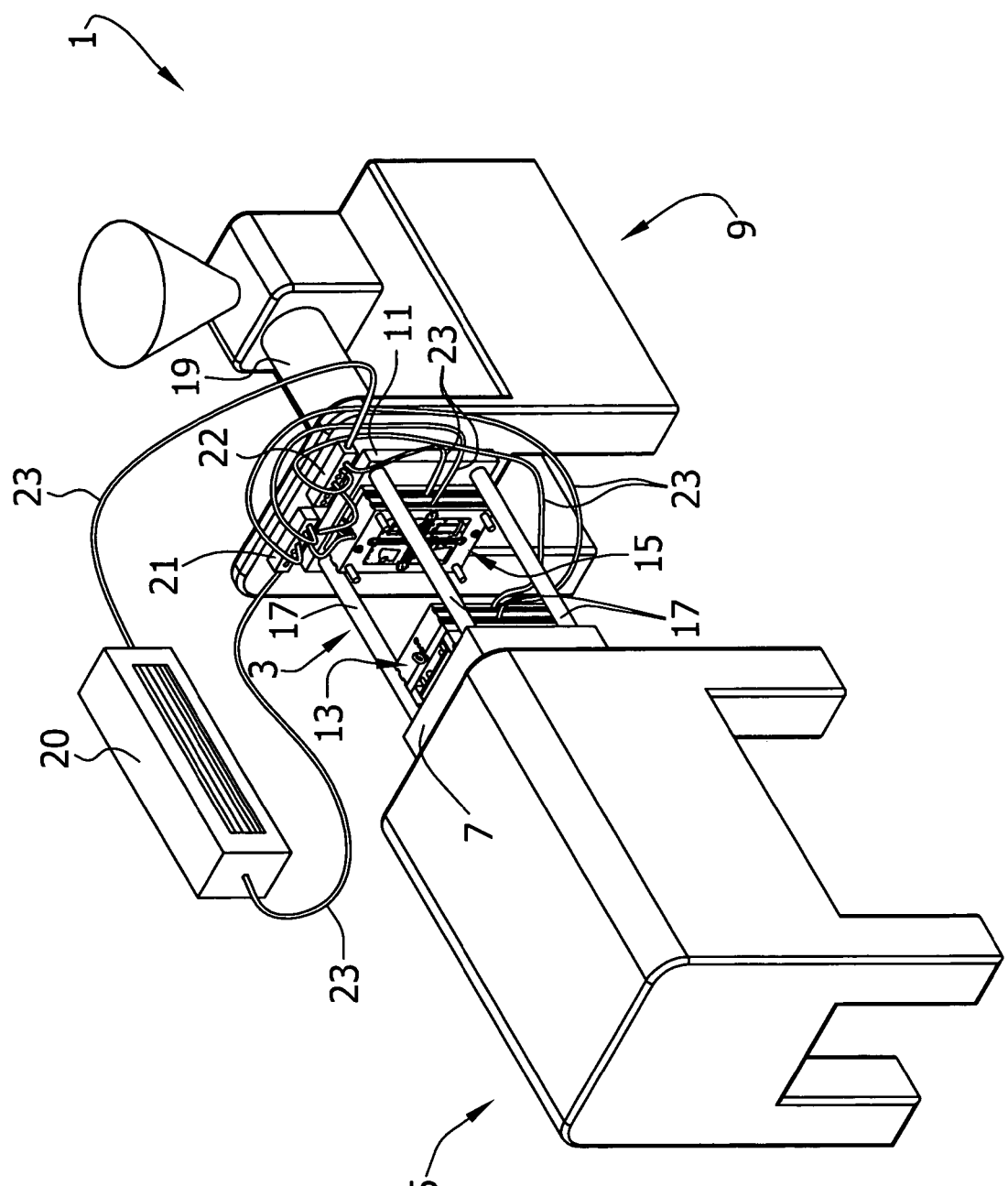
FIG. 1 is a schematic perspective of a plastic injection molding machine including a modular mold of the present invention.
Figure 1A:
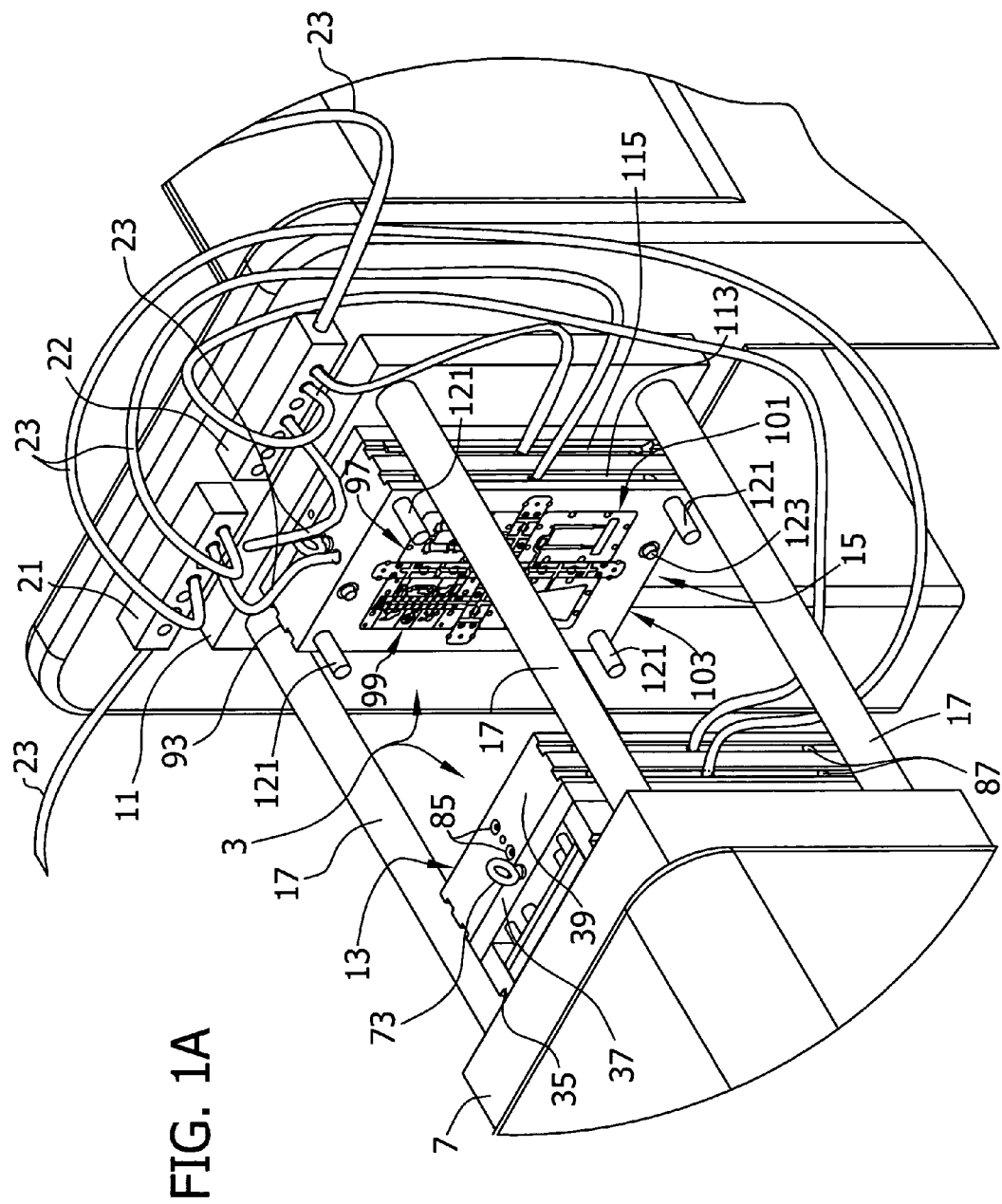
FIG. 1A is an enlarged, fragmentary perspective of the mold machine and modular mold of FIG. 1.

Referring now to the drawings, and in particular to FIGS. 1 and 1A, a plastic injection molding machine 1 including a modular mold 3 of the present invention is shown (the reference numbers designating their subjects generally). It will be understood that the present invention also has application to other types of molding besides injection molding. The plastic injection molding machine 1 includes a first or "ejection side" machine element (generally indicated at 5) having a movable platen 7 and a second or "static side" machine element (generally indicated at 9) having a fixed platen 11. The mold 3 includes a first or "ejection side" mold member (generally indicated at 13) releasably mounted on the movable platen 7 of the ejection side machine element 5, and a second or "static side" mold member (generally indicated at 15) releasably mounted on the fixed platen 11 of the static side machine element 9. The ejection side machine element 5 includes a force ejection mechanism (not shown) that actuates the ejection side mold member 13 to eject molded objects from the mold 3. The mounting of the mold members 13, 15 could be reversed without departing from the scope of the present invention.

The movable platen 7 moves relative to the fixed platen 11 to move the ejection side mold member 13 into engagement with the static side mold member 15 for molding objects, and moves away from the fixed platen to separate the ejection side mold member from the static side mold member to allow molded objects to be ejected from the ejection side mold member. The movable platen 7 and ejection side mold member 13 are urged against the fixed platen 11 and static side mold member 15 with great force so that the mold members experience large pressures at their interface. As is known, the reason for the large forces and pressure is to hold the mold members 13, 15 in tight, sealing relation as plastic molding material is injected under high pressures into the mold members. The molding material may be other than plastic (e.g., a powdered metal), and may be gravity fed or otherwise delivered to the mold within the scope of the present invention.

Plastic injection molding (and other forms of molding and casting) can be used to make complete parts, or components of larger products. The term "object," as used herein, is intended to refer to either complete parts or components which are assembled in a different manufacturing step(s) into the complete parts. It will be appreciated that in FIGS. 1 and 1A, the movable platen 7 is shown spaced from the fixed platen 11a much greater distance than it would be in operation of the injection molding machine 1 so that the mold members may be better seen. Four guide rails 17 (only three may be seen in the drawings) connect the fixed and movable platens 7, 11 and guide the movement of the movable platen relative to the fixed platen. The static side machine element 9 mounts a liquefied plastic injection device 19 which melts a solid plastic source (not shown) and injects under pressure a predetermined quantity of the liquid molding material into the mold 3 after the movable platen 7 moves to close the mold members of the mold.

The injection molding machine 1 includes a cooling system 20 for circulating a cooling liquid to the mold members 13, 15 for use in cooling the injected plastic in the mold members. The cooling system includes a source of cooling liquid (e.g., water), a heat exchanger to remove heat from the cooling liquid and a pump to circulate the cooling liquid (not shown). The cooling system 20 further includes a feed manifold 21 and a return manifold 22 for distributing cooling liquid to the mold members 13, 15. Hoses 23 extend from the manifolds 21, 22 to the mold members 13, 15 to deliver the cooling liquid to the mold members and return heated cooling liquid from the mold members, as will be described in more detail below. Other hoses 23 extend from the manifolds 21, 22 to the cooling system 20 that continuously provides the cooling liquid (e.g., water). FIGS. 1 and 1A show only a few hoses 23 extending from the manifolds 21, 22 to the ejection side mold member 13 and static side mold member 15 for the sake of clarity of illustration. In actual operation, there would be many more hoses 23 extending to the static side mold member 15 and also hoses extending to the ejection side mold member 13. The construction and operation of the injection molding machine 1 including the liquid cooling system 20 are well known to those of ordinary skill in the art, and accordingly only a general description of the construction and operation is given here.

In some molding operations heat or "thermal energy" may be applied to the mold instead of removed. For instance, thermosetting molding material is introduced into the mold at room temperature or below. Heat is transferred to the mold to initiate the thermosetting reaction. Heat may be applied by fluid, but most commonly is applied through electrical resistance heating (e.g., embedded heating rods). Although the embodiments described herein relate to injection molding and cooling, the present invention has application to situations where heat is added to rather than removed form the mold. Broadly speaking, the present invention makes provision for transfer of thermal energy between the mold and an exterior heat transfer system.

The ejection side and static side mold members 13, 15 are shown in additional detail in FIGS. 2-5. In the illustrated embodiment, the ejection side mold member 13 has four submolds (designated generally at 27, 29, 31 and 33, respectively) containing cavities (27A, 27B, 29A-29G, 31A and 33A) shaped for molding respective objects. The objects in the illustrated embodiment are components and accessories for geomatics equipment supports, but the type of object being molded is not critical to the present invention. The ejection side mold member 13 comprises an ejector housing 35 (broadly, "a base plate"), a support plate 37 and a mold plate 39 (see FIGS. 2 and 4). The ejector housing 35 has a generally channel shape including opposite side walls 41, and houses a first ejector device indicated generally at 43. The space between the side walls 41 allows for movement of the first ejector device 43. Longitudinally extending grooves 42 near the back of the ejector housing 35 on both sides receive respective clamps (not shown) associated with the movable platen 7 that releasably fix the ejection side mold member 13 to the movable platen. Eight bolts 44 (only six may be seen in FIG. 4) extend through the ejector housing 35 and support plate 37, and thread into the mold plate 39 to secure the entire ejection side mold member 13 together.

The first ejector device 43 includes an ejector bar plate 45 received between the side walls 41 of the ejector housing 35 and a pin retainer plate 47 resting on the ejector bar plate. The ejector bar plate 45 and pin retainer plate 47 are joined together by fasteners 49. The ejector bar plate 45 and pin retainer plate 47 have aligned openings which slidably receive respective ones of four guide pins 51 (only three are shown) that extend from the ejector housing 35, through four guide bushings 53 (only three are shown) received in the aligned openings, and to the support plate 37. The guide pins 51 guide movement of the ejector bar plate 45 and pin retainer plate 47. Ordinarily, the pin retainer plate would retain ejection pins (not shown) for use in ejecting plastic molded objects from the ejection side mold member 13. However as will be described, the first ejector device 43 is used according to the present invention to actuate other ejector devices associated with the submolds 27, 29, 31, 33 of the ejection side mold member 13.

Figure 2:
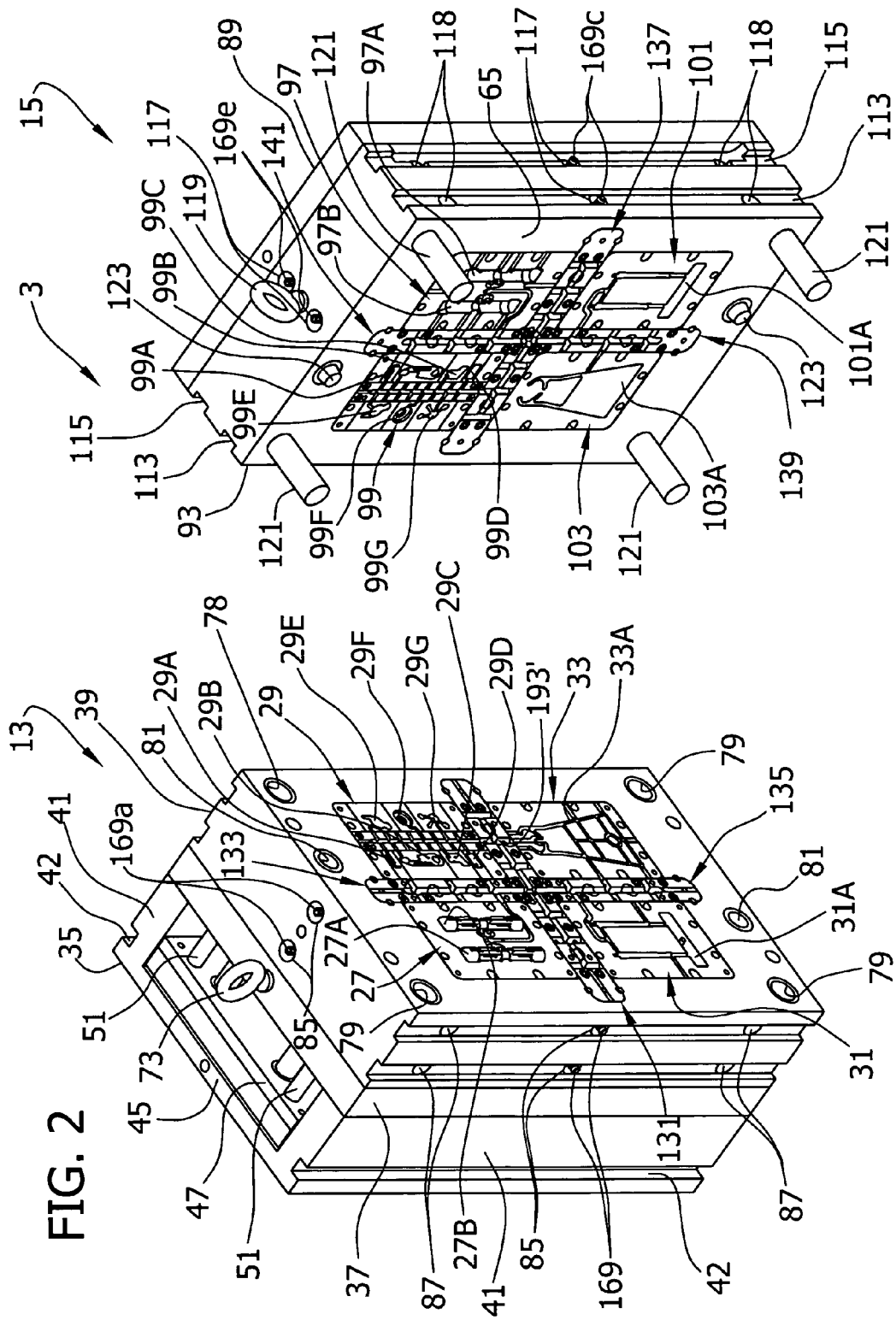
FIG. 2 is a perspective of the modular mold including first (ejection side) and second (static side) mold members shown apart from each other.

Movement of the ejector bar plate 45 and pin retainer plate 47 relative to the ejector housing 35, support plate 37 and mold plate 39 to eject objects is obtained by the aforementioned force ejection mechanism (not shown) of the ejection side machine element 5. The force ejection mechanism includes a driven ejector bar which extends through the movable platen 7 and ejector housing 35 into connection with the ejector bar plate 45. The ejector bar can be extended and retracted to drive operation of the first ejector device 43. The force ejection mechanism is conventional and will not be further described herein. Return pins 57 rest against the ejector bar plate 45 and extend through holes in the pin retainer plate 47, holes in the support plate 37 and holes in the mold plate 39. The heads of the return pins 57 are received in counterbores (not shown) in the back side of the pin retainer plate 47 so that they do not interfere with the flush engagement of the pin retainer plate and ejector bar plate 45. When the ejector bar plate and pin retainer plate 47 are moved toward the support plate 37 (i.e., to actuate ejection of objects), the return pins 57 project outward from a mold face 63 of the mold plate 39. When the ejector bar plate 45 is fully seated against the ejector housing 35 (e.g., as shown in FIG. 2), the ends of the return pins 57 are flush with the mold face 63 of the mold plate 39.

The return pins 57 make certain that the ejector bar plate 45 is fully retracted when the mold members 13, 15 are closed. If the return pins 57 project out from the mold face 63 of the mold plate 39 of the ejection side mold member 13 (i.e., because the ejector bar plate 45 is not fully retracted), they engage a mold face 65 of the static side mold member 15 which pushes the return pins back to flush with the mold face 63 of the ejection side mold member mold plate 39 and completely retracts the ejector bar plate. Failure to fully retract the ejector bar plate 45 could cause ejection pins (not shown in FIGS. 2-5) to protrude into mold cavities 27A, 27B, 29A-29G, 31A, 33A during molding, which would cause the molding operation to fail, or at the least damage to the object being molded.

As assembled, the support plate 37 of the ejection side mold member 13 lies directly on the forward faces of the ejector housing side walls 41, transmitting force directly to the ejector housing 35. The support plate 37 has a large central opening 69 that provides access of other ejector devices (to be described) to the first ejector device 43. The support plate 37 is formed with ledges 71 around the periphery of the central opening 69 for engaging and supporting submolds 27, 29, 31, 33 and other structure of the ejection side mold member 13 requiring support. The submolds 27, 29, 31, 33 are subject to high loads when the mold members 13, 15 are closed in order to maintain a seal between the mold members when the molding material is injected at high pressure. If the mold members 13, 15 are not adequately supported, they tend to be pushed back into the ejection side mold member 13, causing a sealing failure. An eyebolt 73 secured to the support plate 37 is used for raising and lowering the ejection side mold member 13 to attach the mold member to the movable platen 7 of the plastic injection molding machine 1, and for removing it from the machine.

The mold plate 39 receives the submolds 27, 29, 31, 33 in a center opening or submold receptacle 77 of the mold plate. The submolds are not illustrated in FIG. 4. In the assembled ejection side mold member 13, the mold plate 39 rests directly on the support plate 37 so that loads experienced by the mold plate are transferred to the ejector housing 35 mounted on the movable platen 7 of the plastic injection molding machine 1. The mold plate 39 is constructed with features to facilitate registration of the ejection side and static side mold members 13, 15 in use. Leader pin bushings 79 fixed in the mold plate 39, and parting line lock cups 81 mounted in the mold plate by cap screws 83 receive structure associated with the static side mold member 15 (described more fully hereinafter) to achieve course and fine registration during the molding operation.

Figure 4:
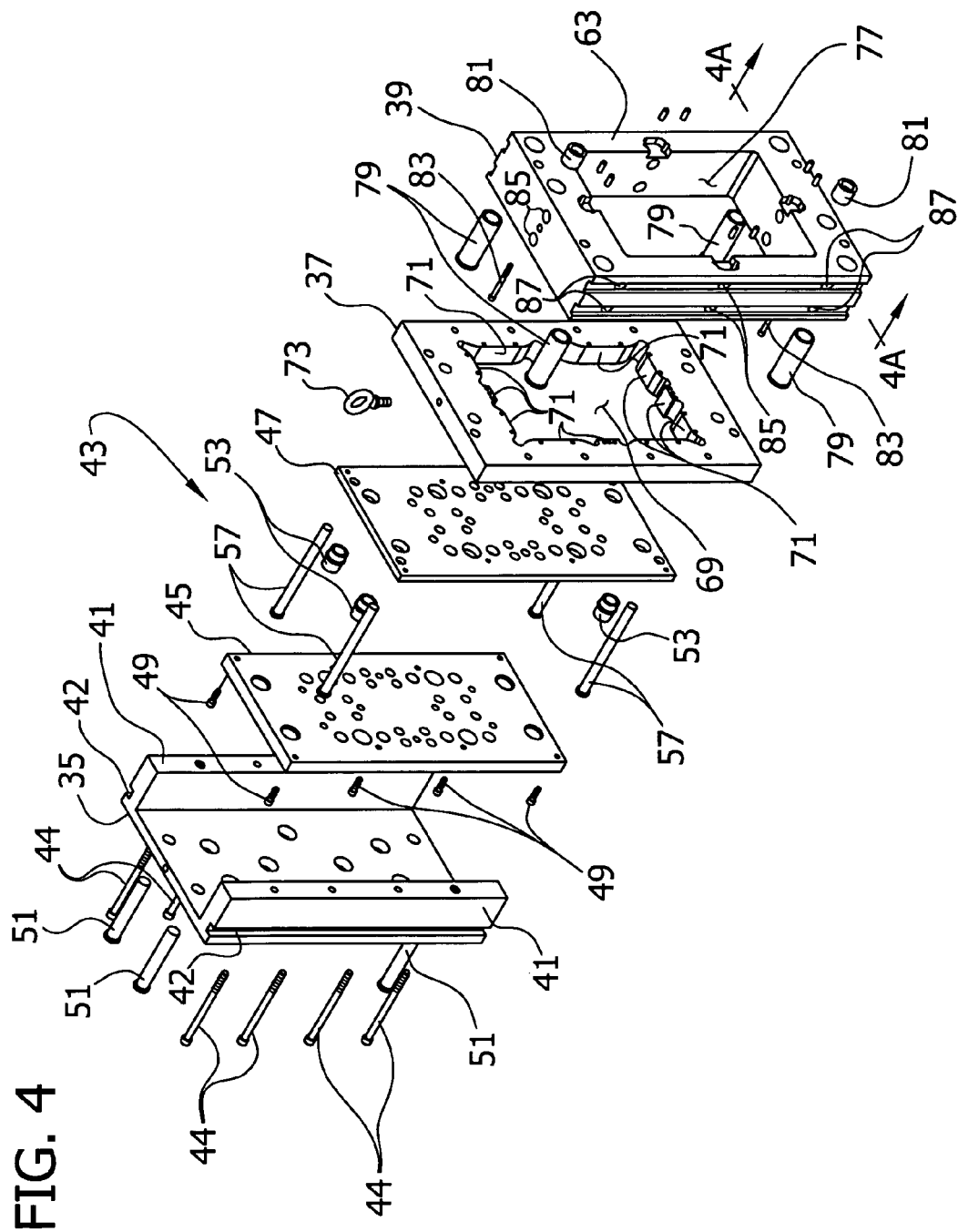
FIG. 4 is an exploded perspective of the ejection side mold member of FIG. 3.
Figure 4A:
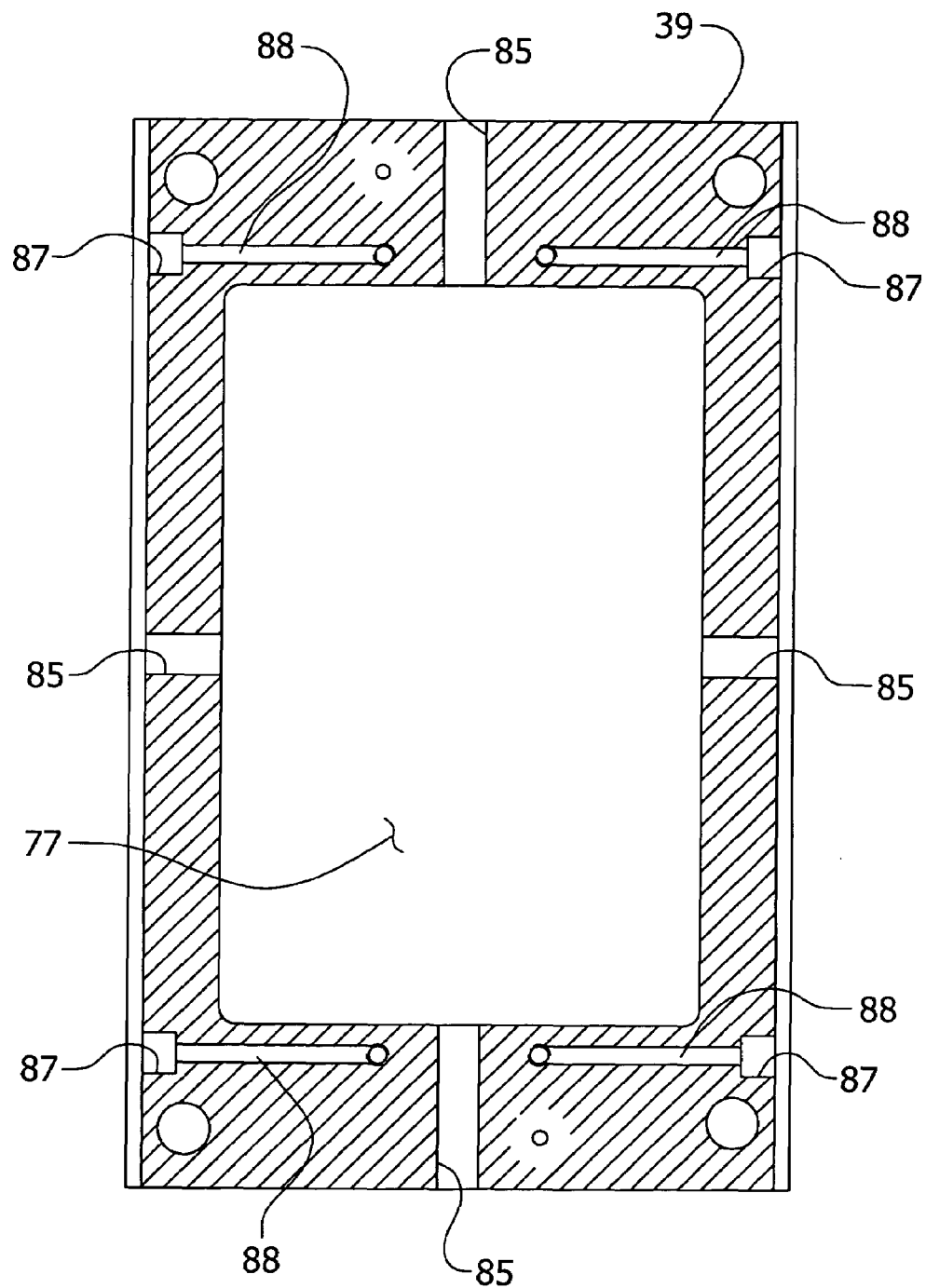
FIG. 4A is a section of a mold plate of the ejection side mold member taken in the plane including line 4A-4A of FIG. 4.

Two openings 85 located generally in the middle of each of the four sides of the mold plate 39 permit connection (as described hereinafter) to parts of the ejection side mold member 13 located in the submold receptacle 77 to the hoses 23 associated with the cooling system 20. Additional openings 87 on the laterally opposite sides of the mold plate 39 provide for connection of the hoses 23 to internal cooling passages 88 located in the mold plate 39 (FIG. 4A). Each of the four cooling passages 88 extend from one opening 87 in the side of the mold plate 39 in a loop back to the adjacent opening 87. Thus, cooling liquid from the cooling system 20 enters the passage 88 via a connection of hose 23 to the mold plate at opening 87, circulates through the passage, and exits the mold plate via another hose 23 connected to the adjacent opening 87. In this way, heat is removed from the mold plate 39 by the cooling system 20.

Figure 5:
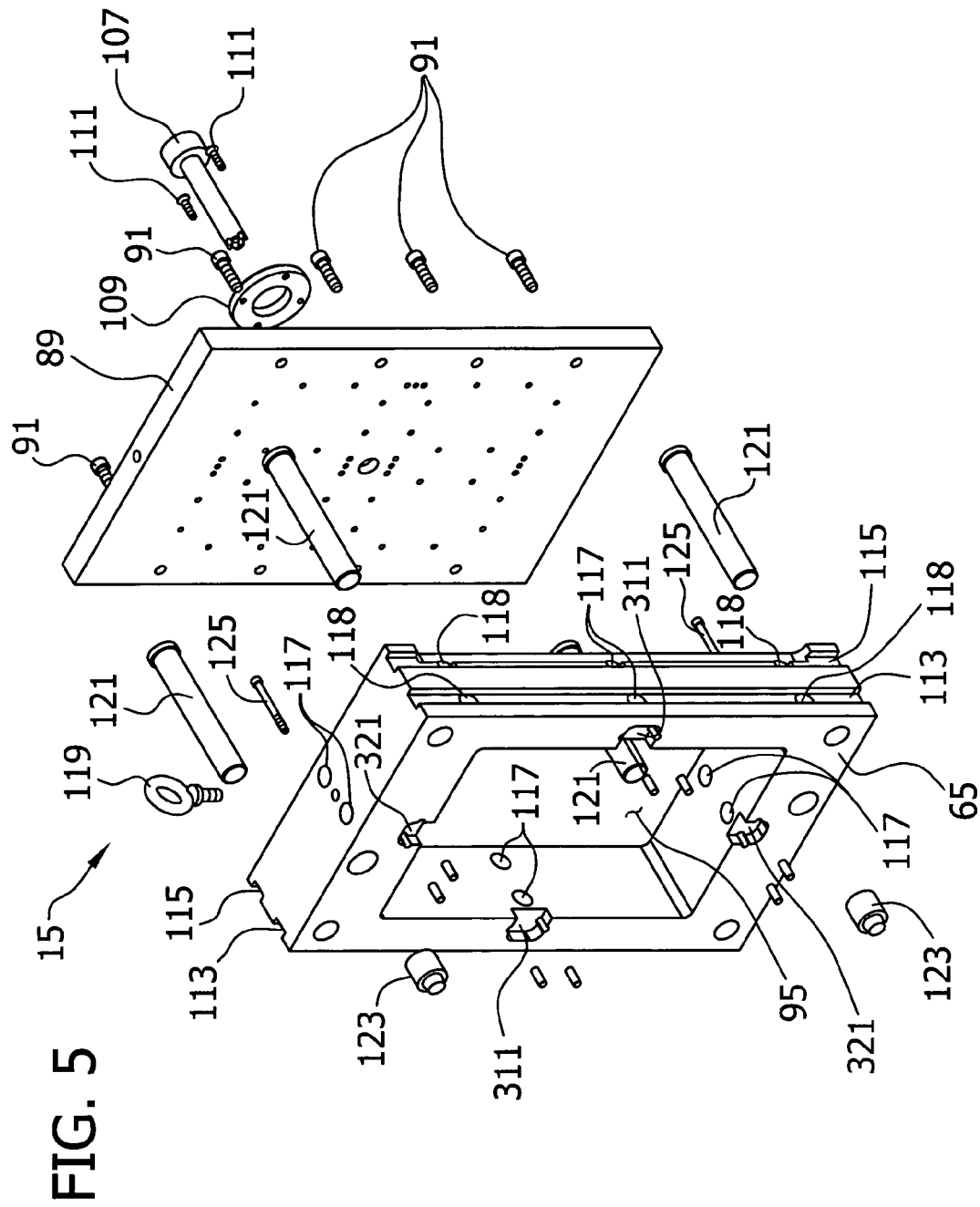
FIG. 5 is an exploded perspective of the static side mold member of FIG. 3.

Referring now to FIGS. 2 and 5, it may be seen that the static side mold member 15 comprises a clamp plate 89 secured by eight bolts 91 (only some of which are shown) to a mold plate 93. The clamp plate 89 is attached to the fixed platen 11 of the static side machine element 9 of the plastic injection molding machine 1. The mold plate has a submold receptacle 95 which receives submolds (generally indicated at 97, 99, 101 and 103), which correspond to submolds 27, 29, 31 and 33, respectively, of the ejection side mold member 13. The submolds 97, 99, 101, 103 have cavities 97A, 97B, 99A-99G, 101A, 103A, which mate with submold cavities 27A, 27B, 29A-29G, 31A, 33A, respectively, when the mold members 13, 15 are closed to form sealed, enclosed mold volumes for receiving molding material and forming the objects.

A sprue bushing 107 is received through a hole in the center of the clamp plate 89. The sprue bushing 107 has a passage through it for injection of liquefied molding material to the submolds. The clamp plate 89 engages and supports the submolds 97, 99, 101, 103 against loads experienced during pressurized injection of molding material in the molding process. Thus, the clamp plate 89 maintains the submolds flush with the mold face 65 of the mold plate 93 of the static side mold member 15. A locating ring 109 mounted on the back of the clamp plate 89 by locating ring screws 111 projects from the clamp plate and is received in a correspondingly shaped recess (not shown) in the fixed platen 11 for locating the static side mold member 15 relative to the fixed platen.

The mold plate 93 rests against the clamp plate 89 so that loads applied to the mold plate 93 are transferred to the clamp plate (and hence the fixed platen 11). There are two grooves 113 and 115 on each longitudinal side of the mold plate 93. The rearward groove 115 of the two grooves is constructed for receiving a clamp (not shown) associated with the fixed platen 11 that tightly secures the static side mold member 15 to the fixed platen. Openings 117 on all four sides of the mold plate 93 permit connection of parts (described hereinafter) in the submold receptacle 95 to the hoses 23 of the cooling system 20. Additional openings 118 allow the hoses 23 to connect to internal cooling passages (not shown, but nearly identical to the internal passages 88 of the mold plate 39) in the mold plate 93. An eyebolt 119 connected to the mold plate 93 is used for handling the static side mold member 15, such as to install the mold member in the plastic injection molding machine 1 and to remove the mold member from the machine. The mold plate 93 also has features which permit very precise registration with the mold plate 39 of the ejection side mold member 13. Leader pins 121 attached to and extending through the mold plate 93 of the static side mold member 15 are received in the leader pin bushings 79 in the mold plate 39 of the ejection side mold member 13 for guiding the mold plates 39, 93 into engagement when the mold members are closed. Conical parting line lock studs 123 secured to the mold plate 93 by cap screws 125 are received in the parting line lock cups 81 just before the mold plates 39, 93 make contact for very fine registration (e.g., within thousandths of an inch) as the mold members 13, 15 close. The conical shape of the parting line studs 123 delays engagement with the parting line lock cups 81 until the last possible moment for final registration.

Figure 3:
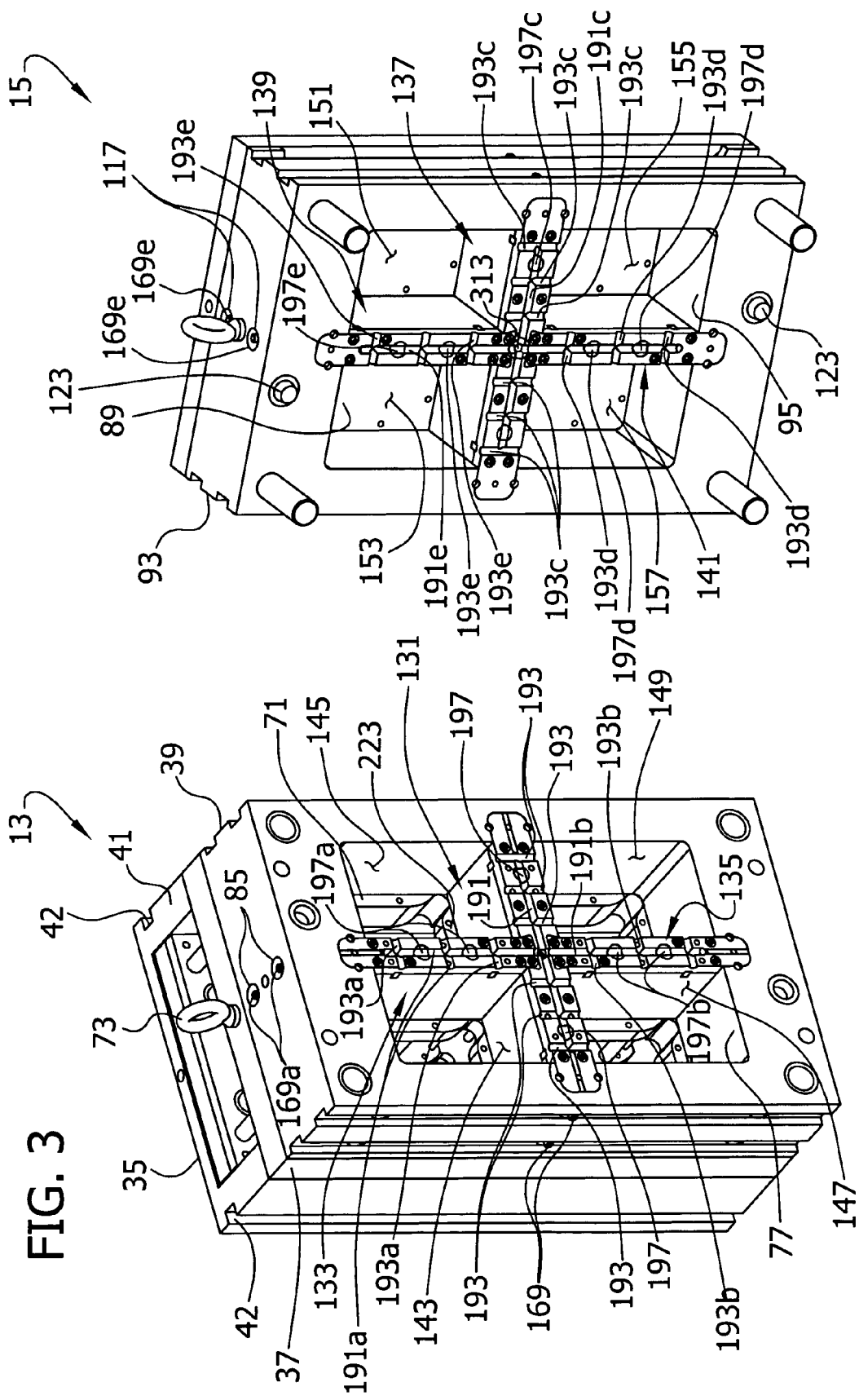
FIG. 3 is the perspective of FIG. 2, but with submolds of the mold removed.
Figure 6:
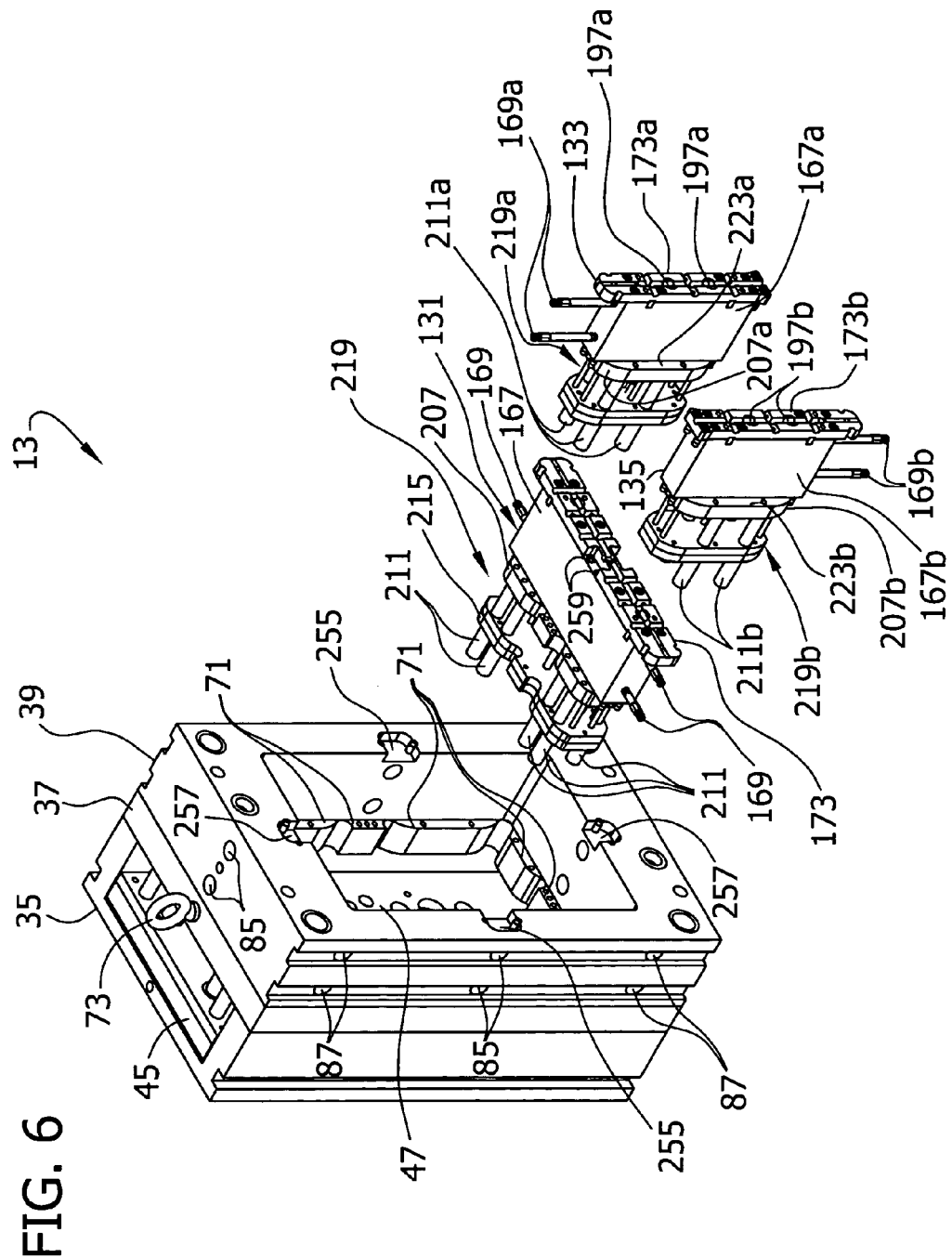
FIG. 6 is a perspective of the ejection side mold member of FIG. 3 with partitions exploded from the ejection side mold member.
Figure 7:
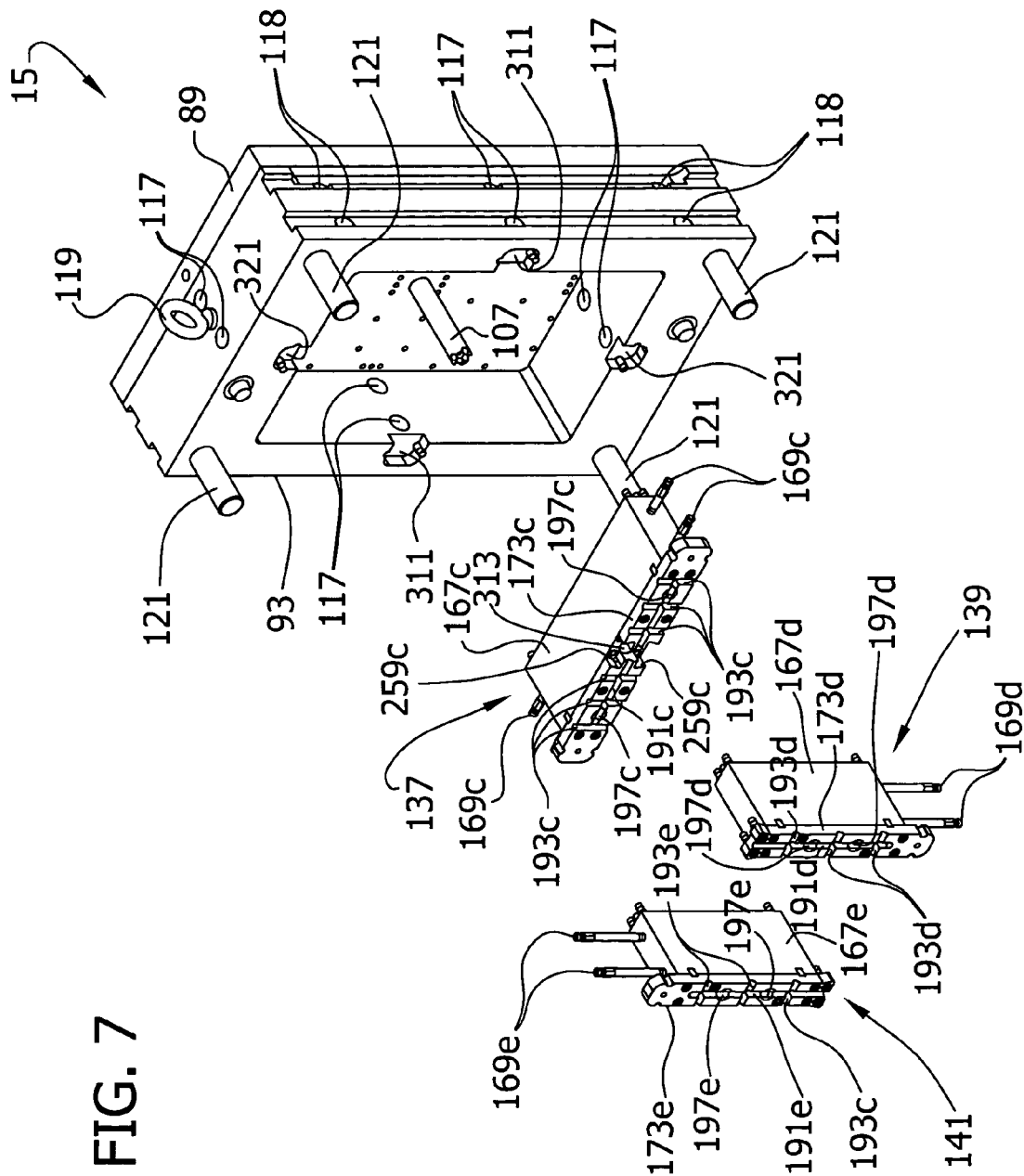
FIG. 7 is a perspective of the static side mold member of FIG. 3 with partitions exploded from the static side mold member.

The ejection side mold member 13 and static side mold member 15 are shown assembled, but without the submolds in FIG. 3. The submold receptacle 77 of the ejection side mold member 13 is shown with partitions 131, 133, 135, and the submold receptacle 95 of the static side mold member 15 is shown with partitions 137, 139, 141, that divide their respective submold receptacles 77, 95 into four sections. The submold receptacle sections of the ejection side mold member 13 are designated 143, 145, 147 and 149. The submold receptacle sections of the static side mold member 15 are designated 151, 153, 155 and 157. Referring now also to FIGS. 6-13, the partitions 131, 133, 135 and 137, 139, 141 are capable of being variously positioned in the submold receptacles 77 and 95 of the mold members 13, 15 to create sections of different sizes for receiving different configurations of submolds. FIG. 6 illustrates the partitions 131, 133, 135 of the ejection side mold member 13 of FIG. 3 exploded from the mold member. FIG. 7 illustrates the partitions 137, 139, 141 of the static side mold member 15 of FIG. 3 exploded from the mold member. Except as noted, the constructions of the partitions 137, 139, 141 of the static side mold member 15 are the same as for the ejection side mold member 13 so that a description of the partitions 131, 133, 135 associated with the ejection side mold member will largely suffice for all partitions.

Referring again to FIG. 6, the partitions of the ejection side mold member 13 include a primary partition 131 and two secondary partitions 133, 135. The primary partition 131 spans the full width of the submold receptacle 77 and is secured at opposite ends to the mold plate 39. The secondary partitions 133, 135 extend from the primary partition 131 to an adjacent side of the submold receptacle 77. As shown in FIGS. 8, 9, 10 and 11, the primary partition 131 comprises a body 167 made of a suitable material, such as a block of aluminum or steel. A particularly preferred aluminum alloy for the body 167 is sold under the trademark FORTAL. Preferably, the body 167 is formed of the same material as the mold plate 39 so that the two have identical or similar thermal expansion characteristics.

The body 167 is drilled and plugged to form two distinct internal passages 168 (FIG. 10) for circulating coolant through the body. The body 167 may be broadly considered a "heat transfer member". It will be understood that heat transfer members (not shown) may be placed in contact with the submolds 27, 29, 31, 33, 97, 99, 101, 103 (or with other submolds) for cooling the submolds without operating to partition the submold receptacle 77, 95 into sections. Such heat transfer members that do not function as partitions would have a different shape than the body 167. The coolant loop passages 168 in the body 167 communicate with the cooling system 20 of the plastic injection molding machine 1 by way of pairs of fittings 169 screwed into the body on opposite ends. Each fitting 169 is aligned with (and received in) one of the holes 85 in the mold plate 39 for connection to one of the hoses 23 extending from the cooling system manifolds 21, 22 of the injection molding machine 1 (shown in FIGS. 1 and 1A). It is also possible to connect (using a separate conduit, not shown) one fitting 169 on one end of the body 167 to another fitting on an opposite end of the body so that the internal passages 168 within the body are placed in series (i.e., as a single coolant loop). Preferably a suitable quick connect/disconnect fastening arrangement (not shown) of the hoses 23 and fittings 169 is employed.

A runner channel plate 173 is mounted on top of the body 167 (broadly, "a substrate") by bolts 175 that are threaded into inserts 177 screwed into the body (FIG. 11). In the illustrated embodiment, the runner channel plate 173 is made of steel (e.g., P20 steel) for better wear results. The inserts 177 protect the aluminum body 167 from wear as the bolts 175 are taken out and screwed back in over the life of the partition 131. However, it will be understood that the runner channel plate 173 can also be made of the same material as the body 167 without departing from the scope of the present invention.

The runner channel plate 173 is also secured (along with the body 167) to the support plate 37 of the ejection side mold member 13 (see FIG. 4) by long bolts 179 extending through the runner channel plate and body, and threaded into the support plate 37. Still further, keys 181 are received in corresponding channels 183, 185 in the body 167 and in the underside of the runner channel plate 173 to secure the two together. The keys 181 are attached by screws 187 to the body 167 and are held in the channels 185 of the runner channel plate 173 by clamping achieved by the bolts 175. The keys 181 are employed to restrict relative thermal expansion between the steel runner channel plate 173 and aluminum body 167, which occurs because they are made of different materials.

The runner channel plate 173 has a longitudinally extending runner channel 191, and a series of transversely extending runner channels 193 that direct the liquefied molding material into the various cavities 27A, 27B, 29A-29G, 31A, 33A of the submolds 27, 29, 31, 33. The configuration of the runner channels 191, 193 is not arranged for use with a particular submold or submolds. The submolds 27, 29, 31, 33 are configured so that they block the transversely extending runner channels 193 which are not needed. Referring to FIG. 2, it may be seen that, for example, only the transverse runner channel designated 193' communicates molding material to submold 33. The other transverse runner channels open into the sides of the submolds, which plug the transverse runner channels 193 not needed in the arrangement of submolds shown in FIG. 2. The primary partition 131 also has two runner channel shutoff valves 197 mounted on the runner channel plate 173 and projecting into the longitudinal runner channel 191 (FIG. 11). The runner channel shutoff valves 197 each have a generally "U" shape, and can be rotated about a vertical axis between an open position in which the U-shaped valve is aligned with the longitudinal runner channel 191 to permit flow past the valve, and a closed position in which the valve is turned transverse to the longitudinal runner channel and blocks the flow of molding material past the valve. A friction ring 199 associated with each shutoff valve 197 holds the valve in a selected rotational position so that the valve will not be inadvertently turned by flow of molding material. The friction can be overcome manually to select the position of each shutoff valve 197.

A support panel 207 is attached by bolts 209 to the underside of the body 167. The support panel 207 is engaged by multiple support pillars 211 that are secured to the support panel by threaded fasteners 213. The support pillars 211 slidably extend through an ejector bar plate 215 and pin retainer plate 217 of a second ejector device (indicated generally at 219) associated with the primary partition 131. The bottom ends of the pillars 211 pass through the pin retainer plate 47 and ejector bar plate 45 to abut the ejector housing 35 of the ejection side mold member 13. Thus, loads applied to the primary partition 131 during molding operations are transferred to the ejector housing 35 and to the movable platen 7. In addition, the end margins of the body 167 overlie and are pinned to ledges 71 of the support plate 37 of the ejection side mold member 13. The support plate 37 and support pillars 211 cooperate to rigidly hold the partition 131, so that an upper surface of the runner channel plate 173 is coplanar with the mold face 63 of the mold plate 39 at all times. The support panel 207 of the partition is located in the central opening 69 of the support plate 37. The support panel 207 has ledges 223, 225 which project laterally outwardly from the sides of the body 167. Ledges 223 projecting from opposite sides of the body near the center, support the secondary partitions 133, 135. Pairs of oppositely extending ledges 225 nearer to the ends of the body 167 engage the undersides of respective submolds 27, 29, 31, 33 to support the submolds. The submolds 27, 29, 31, 33 are attached by threaded fasteners to the ledges 71, 223, 225 that they engage. It will be understood that the ledges 71 of the support plate 37 and the ledges 223, 225 of the support panel 207 cooperate to rigidly position the submolds 27, 29, 31, 33 and secondary partitions 133, 135 against movement back into the ejection side mold member 13 away from the plane of the mold face 63 of the mold plate 39.

The second ejector device 219 is used to remove runners (not shown) that invariably reside in the runner channels 191, 193 of the runner channel plate 173 after an object has been molded. The second ejector device 219 includes the ejector bar plate 215 and pin retainer plate 217 previously described. The ejector bar plate 215 and pin retainer plate 217 are secured together by bolts 231. The ejector bar plate 215 rests on the pin retainer plate 47 of the first ejector device 43 when the primary partition 131 is installed in the submold receptacle 77. Thus, actuation of the first ejector device 43 causes the second ejector device 219 associated with the primary partition 131 to be actuated, meaning the ejector bar plate 215 and pin retainer plate 217 move toward the body 167 of the partition. A plurality of ejection pins 233 have heads that rest on the ejector bar plate 215 and are received in counterbores (not shown) on the underside of the pin retainer plate 217. The ejection pins 233 extend through the pin retainer plate 217, the support panel 207 and the body 167 to respective holes in the runner channels 191, 193 of the runner channel plate 173. Steel sleeves 237 in the body 167 protect the body from wear as the steel ejection pins 233 slide back and forth in the body. Prior to ejection, when the ejector bar plate 215 is spaced farthest away from the body 167, the distal ends of the ejection pins 233 are each generally flush with the bottom of runner channels 193. When the second ejector device 219 is actuated, moving the ejector bar plate 215 and pin retainer plate 217 closer to the body 167, the ejection pins 233 project out from the bottom of the runner channels 193, pushing solidified molding material (runners) out of the runner channels 191, 193. The ejector bar plate 215 and pin retainer plate 217 slide along the support pillars 211 as they move.

A sprue puller 239 looks similar to the ejection pins 233, and extends through the pin retainer plate 217, support panel 207 and body 167 in the same way as the ejection pins 233. A steel sprue puller sleeve 241 in the body 167 protects the body from wear caused by movement of the sprue puller 239. The sprue puller 239 extends into a hole 243 in the center of the runner channel plate 173, and is shaped in a conventional manner for attaching to and pulling out the column of solidified molding material in the sprue bushing 107. The primary partition 131 also has return pins 245, which perform a function similar to the return pins 57 described above. The return pins rest on the ejector bar plate 215 of the second ejector device 219 and have heads received in counterbores (not shown) on the underside of the pin retainer plate 217. The return pins 245 extend through the pin retainer plate 217, support panel 207 and body 167, and are received in notches 246 in the runner channel plate 173 near opposite ends of the runner channel plate. Sleeves 247 in the body 167 encircle the return pins 245 and protect the body from wear. Only two of the sleeves 247 are exploded from the body 167 in FIG. 11. The return pins 245 may engage the mold plate 93 of the static side mold member 15 when the mold members 13, 15 are brought together to push the ejector bar plate 215 to a fully retracted position away from the body 167. The return pins 245 make certain that no ejection pin 233 is protruding into the runner channel 193 when molding material is being injected.

The ends of the runner channel plate 173 projecting out from the ends of the body 167 are received in respective partition locator recesses 255 formed in the mold plate 39 (see FIG. 6). These recesses 255 can be precisely located when the mold plate 39 is machined for very accurate positioning of the primary partition 131. The primary partition 131 extends transversely across the width of the submold receptacle 77.

Figure 8:
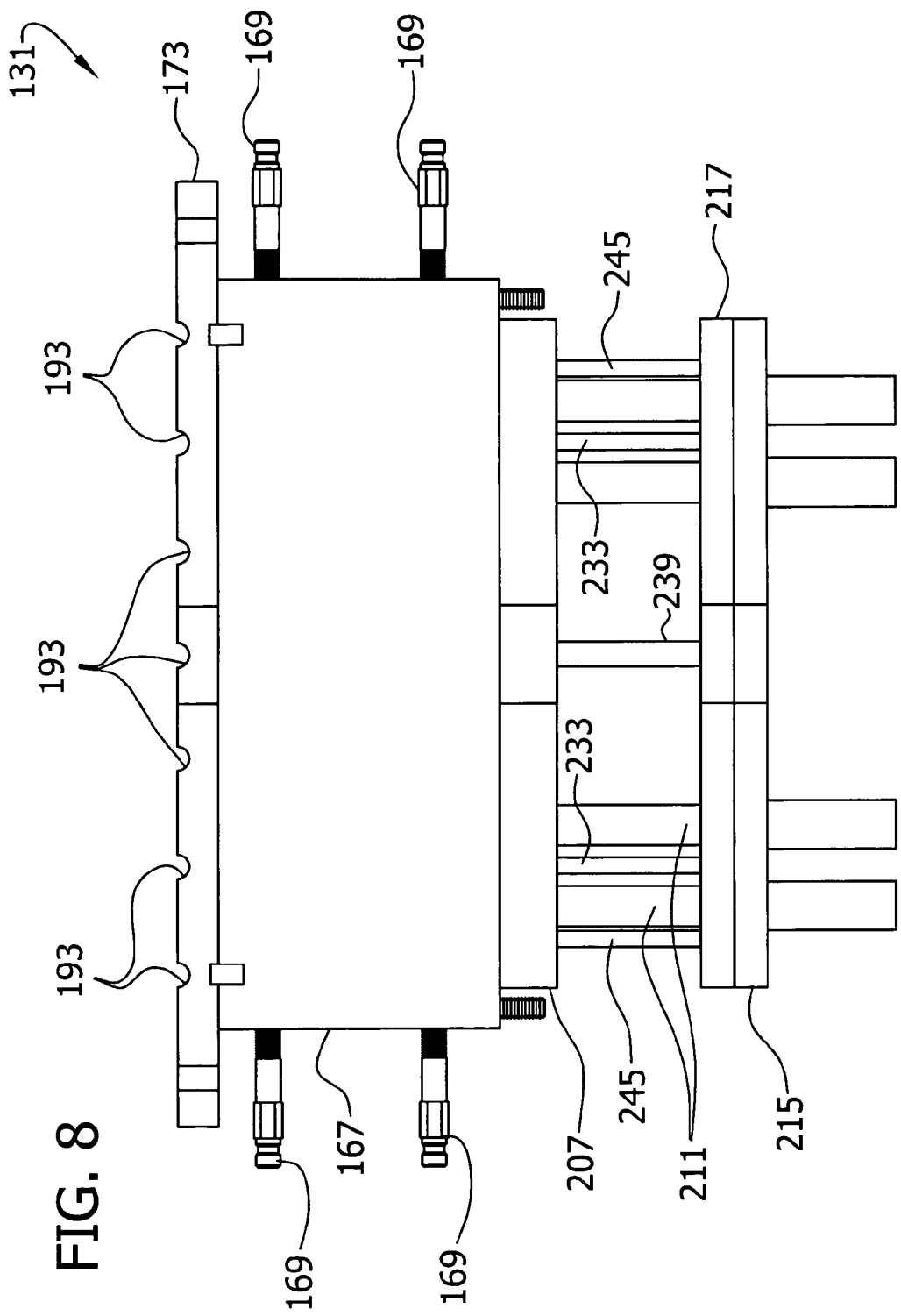
FIG. 8 is an elevation of a primary partition.
Figure 8A:
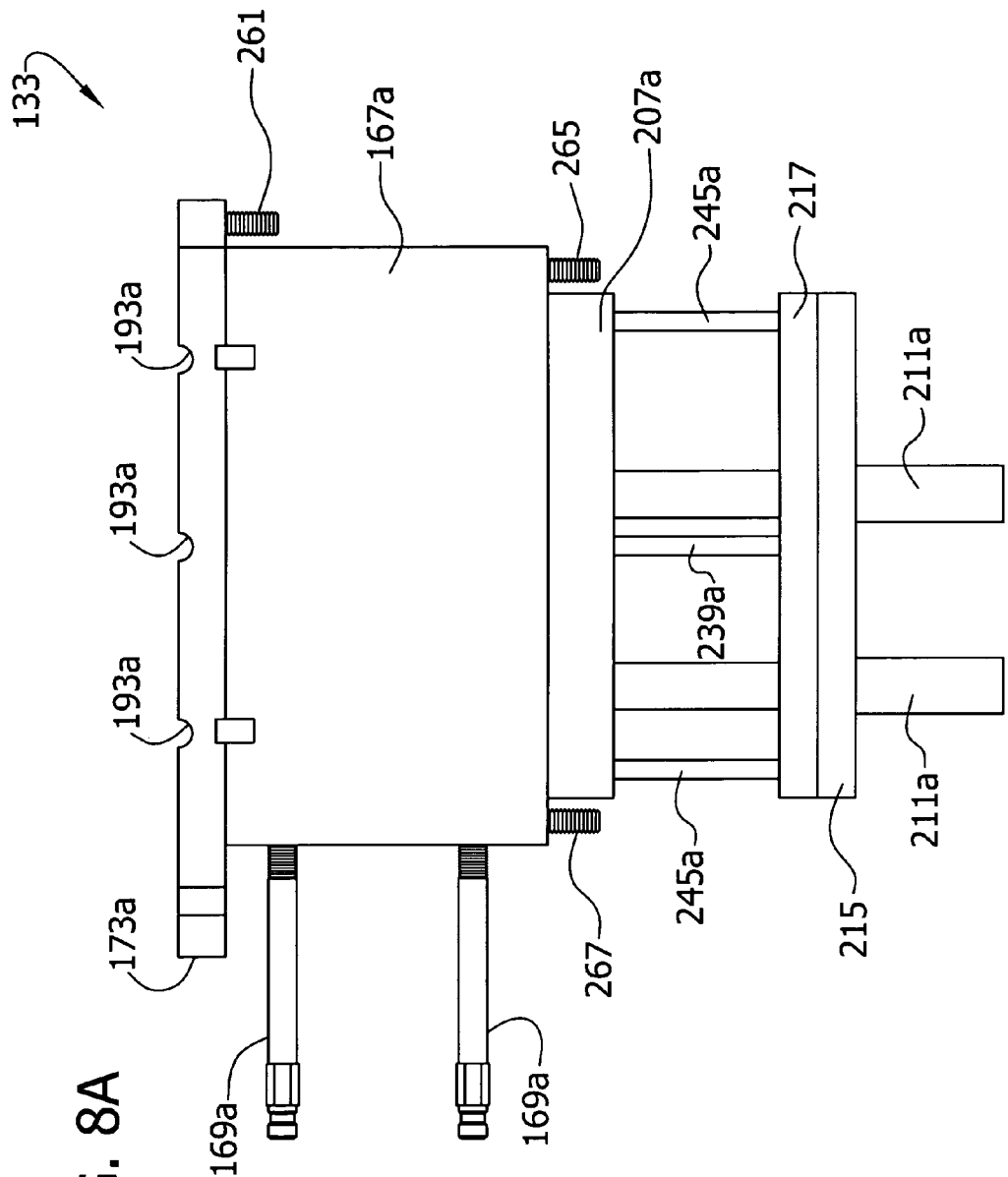
FIG. 8A is an elevation of a secondary partition.
Figure 9:
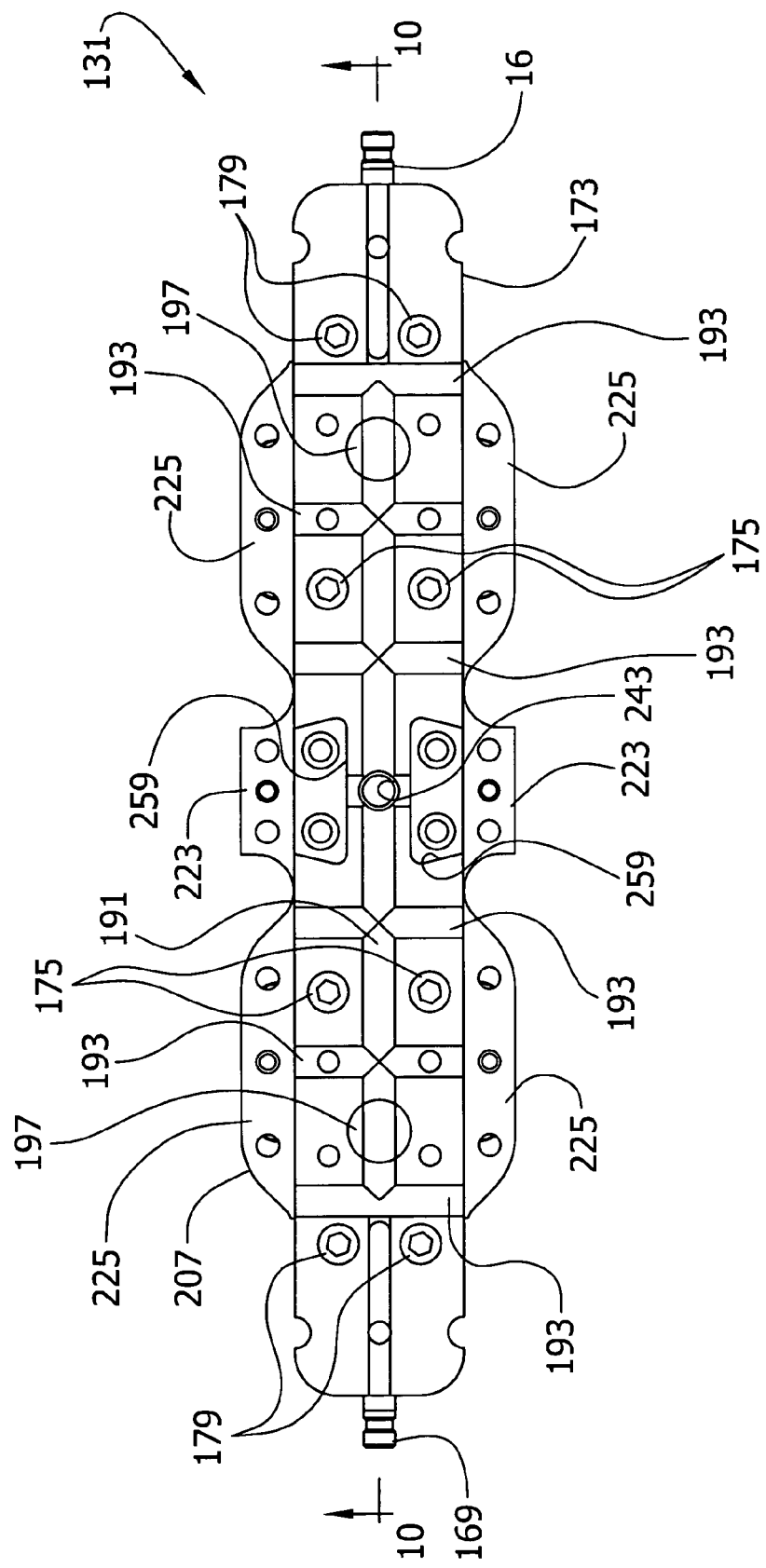
FIG. 9 is a top plan of the primary partition of FIG. 8.
Figure 9A:
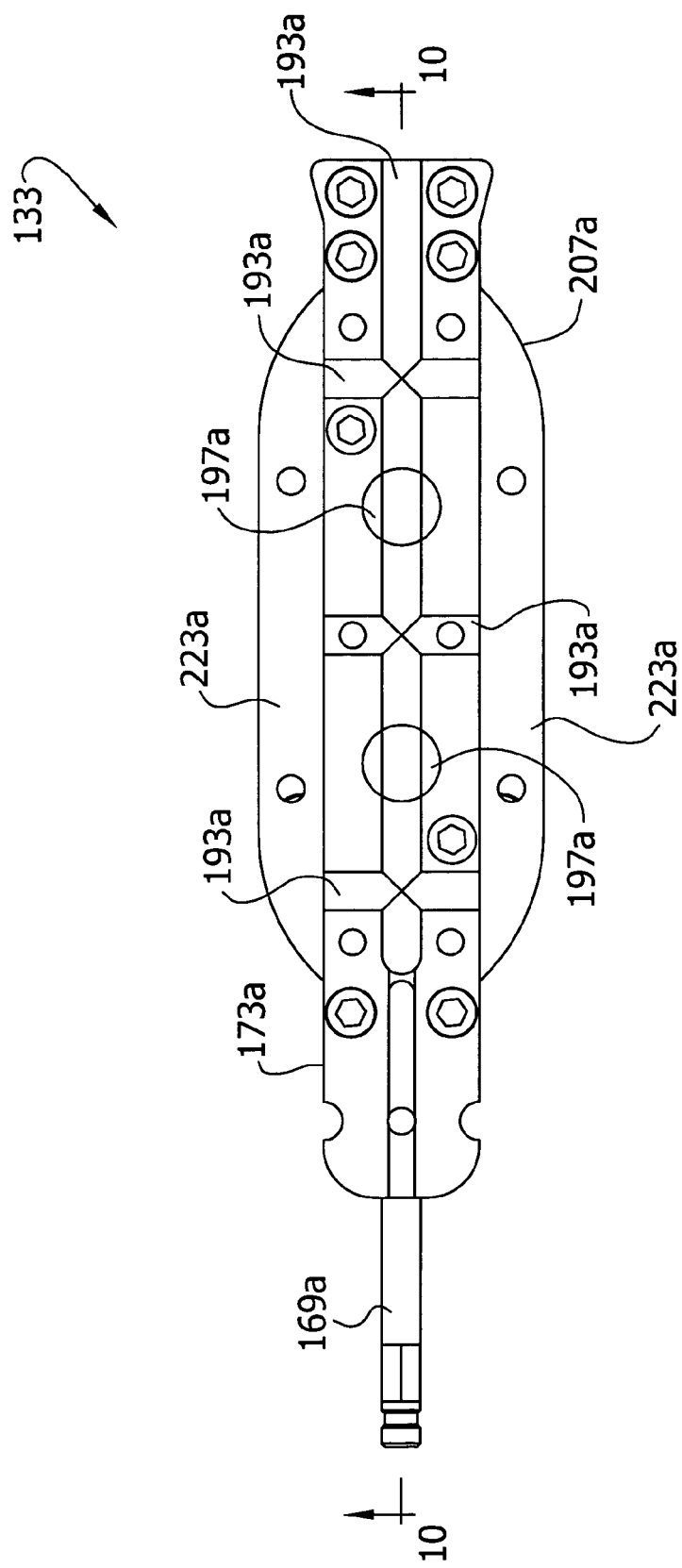
FIG. 9A is a top plan of the secondary partition of FIG. 8A.

The secondary partitions 133, 135 of the ejection side mold member 13 have a construction substantially similar to the construction of the primary partition 131, and so will not be described in detail. The corresponding parts have the same reference numerals as the parts of the primary partition 131, followed by the letter "a" or "b". The secondary partition 133 is shown in some additional detail in FIGS. 8A, 9A and 10A. The runner channel plates 173a, 173b are each shaped at one end to be received in a respective one of recesses 257 in the face 63 of the mold plate 39 of the ejection side mold member 13 for precise location of the partitions 133, 135 relative to the mold plate. The other end of each secondary partition 133, 135 has a dovetail shape that is received in a correspondingly shaped notch 259 in the runner channel plate 173 of the primary partition 131. Two bolts 261 secure the dovetail end of each runner channel plate to the primary partition 131. The bolts 261 are received in inserts 263 (FIG. 11) in the partition body 167. An additional pair of bolts 265 secure each secondary partition 133, 135 to the ledge 223 of the support panel 207 that underlies and supports the secondary partition where it abuts the primary partition 131. Another pair of bolts 267 secure each secondary partition 133, 135 to one of the ledges 71 of the support plate 37. The runner channel plate 173a, 173b of each secondary partition 133, 135 lies flush with the runner channel plate 173 of the primary partition so that a longitudinal runner channel 191a, 191b of the secondary partition aligns with a short transverse runner channel 191 of the primary partition 131 so that liquid molding material can flow into the runner channel plate of the secondary partition.

Figure 10:
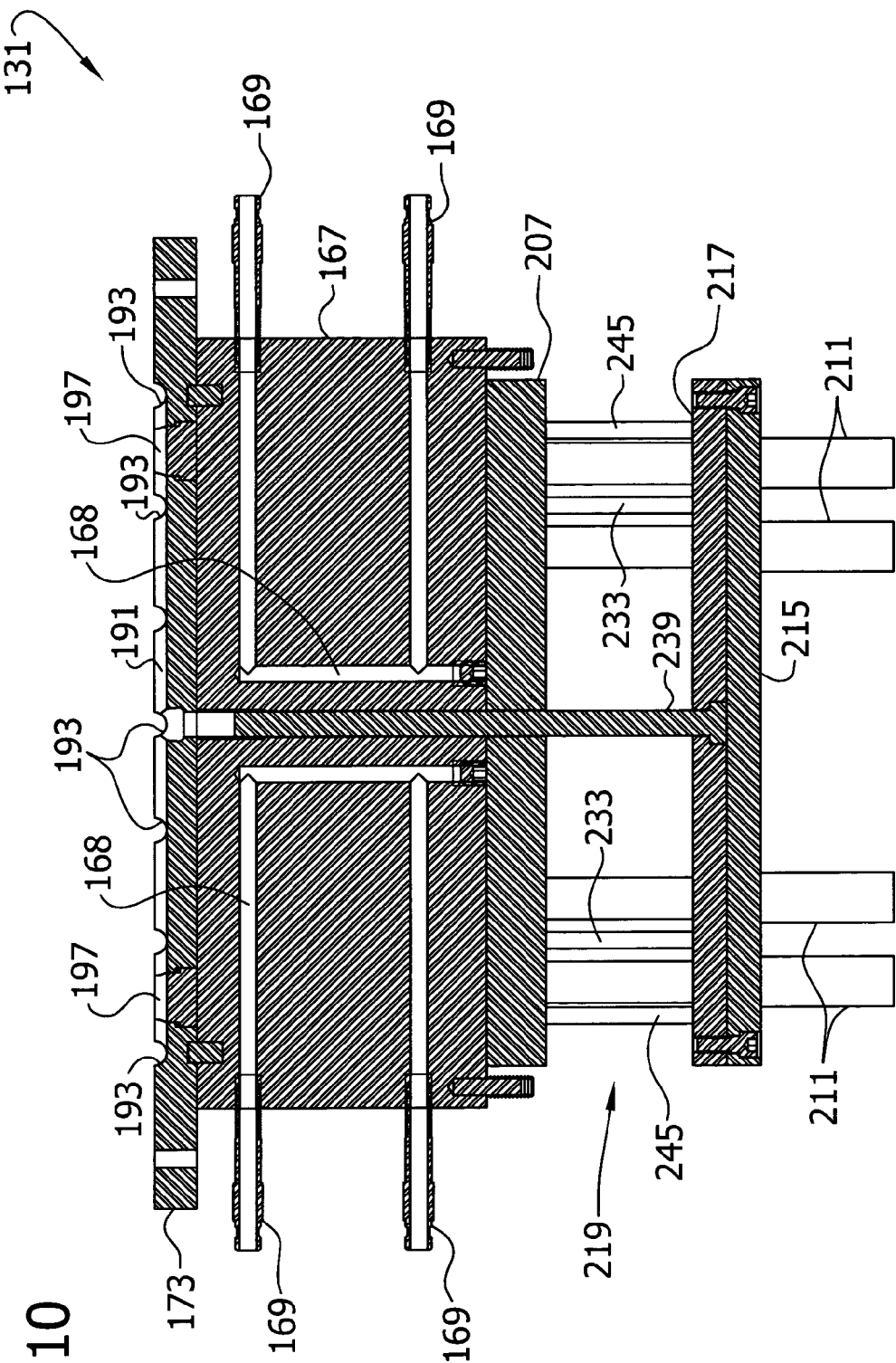
FIG. 10 is a section taken in the plane including line 10-10 of FIG. 9.
Figure 10A:
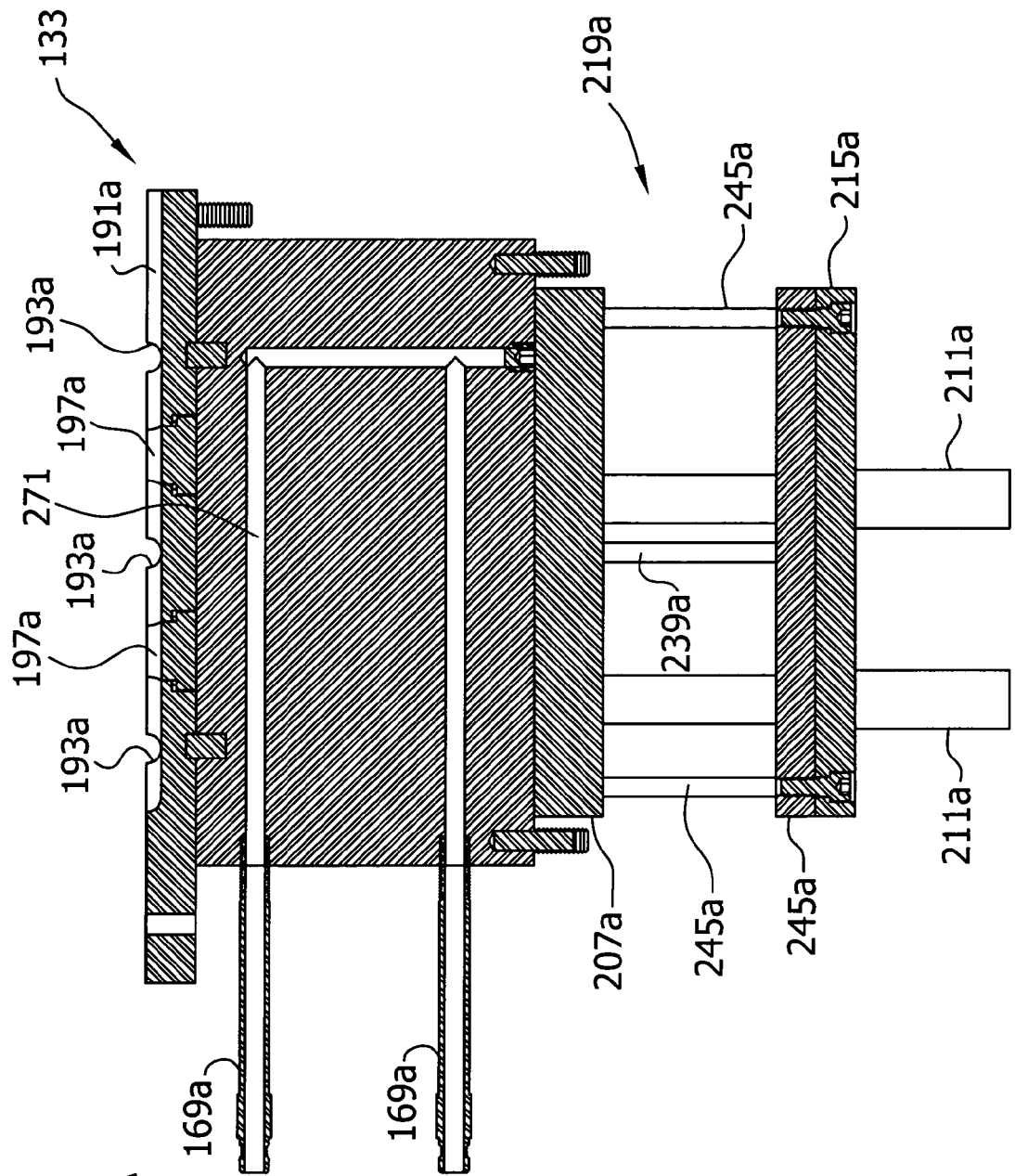
FIG. 10A is a section taken in the plane including line 10A-10A of FIG. 9A.

The secondary partitions 133, 135 also have runner channel shutoff valves 197a, 197b to selectively block or open portions of runner channels 191a, 191b, 193a, 193b in the runner channel plates 173a, 173b of the secondary partitions. The runner channel shutoff valves 197a, 197b have the same construction and operation as the runner channel shutoff valve 197 of the primary partition 131. Internal coolant passages 271 in the body of the secondary partition 133 are illustrated in FIG. 10A. There are only two fittings 169a, 169b for each body 167a, 167b of the secondary partitions. The internal passages 271 are formed in body in the same way (drilling and plugging) as the passages 168 of the primary partition 131. The support panel 207a, 207b of each secondary partition 133, 135 has a single support ledge 223a, 223b on each side of the body 167a, 167b for supporting one of the submolds 27, 29, 31, 33. However, the number of submolds supported by the ledges 223, 225, 223a, 223b of the support panels 207, 207a, 207b of the primary partition 131 and secondary partitions 133, 135 can be other than described without departing from the scope of the present invention. The secondary partitions also have second ejector devices 219a, 219b which are substantially similar to the second ejector device 219 of the primary partition 133.

The submolds 27, 29, 31, 33 are sized smaller than the submold receptacle sections 143, 145, 147, 149 into which they are received. The amount by which the submolds 27, 29, 31, 33 are smaller is determined according to the expected thermal expansions of the submolds and partitions 131, 133, 135 in use. Generally, the spacing between the submolds 27, 29, 31, 33 and the adjacent partition 131, 133, 135 or side of the submold receptacle 77 is selected so that, when cool, the submolds can be easily slid into and out of the sections 143, 145, 147, 149, but when warmed by pressurized injection of hot molding material, the submolds expand into engagement with the partition or mold plate at the side of the submold receptacle to promote conductive heat transfer between the submold and the partition or mold plate 39. In the illustrated embodiment, the spacing is about 0.5 thousandths of an inch per inch of length of the side of the submold 27, 29, 31, 33. In other words, if one side of the submold is five inches long, then the spacing between that side and the adjacent partition 131, 133 or 135 or side of the submold receptacle 77 would be 2.5 thousandths of an inch. However it is to be understood that depending on the materials used and the configuration of the submold, the spacing ratio could be different. Moreover, it is possible that one or more of the partitions 131, 133, 135 could expand into contact with the submold 27, 29, 31, 33. For instance, if a partition (not shown) had internal heating rods for applying heat to the submold, the partition would expand before the submold.

The coolant in the internal passages 168, 271 of the partitions 131, 133, 135 can then offload the heat to the cooling system 20 of the plastic injection molding machine 1. It is noted that each side of every submold 27, 29, 31, 33 engages a surface that is cooled by an internal cooling passage that removes heat to a location outside the mold 3. In this way a highly efficient heat transfer from the submolds 27, 29, 31, 33 can be accomplished. The heat transfer is further augmented when the material of critical parts of the submolds and the bodies 167, 167a, 167b of the partitions 131, 133, 135 and mold plate 39 are made of aluminum (e.g., FORTAL aluminum alloy).

Figure 12:
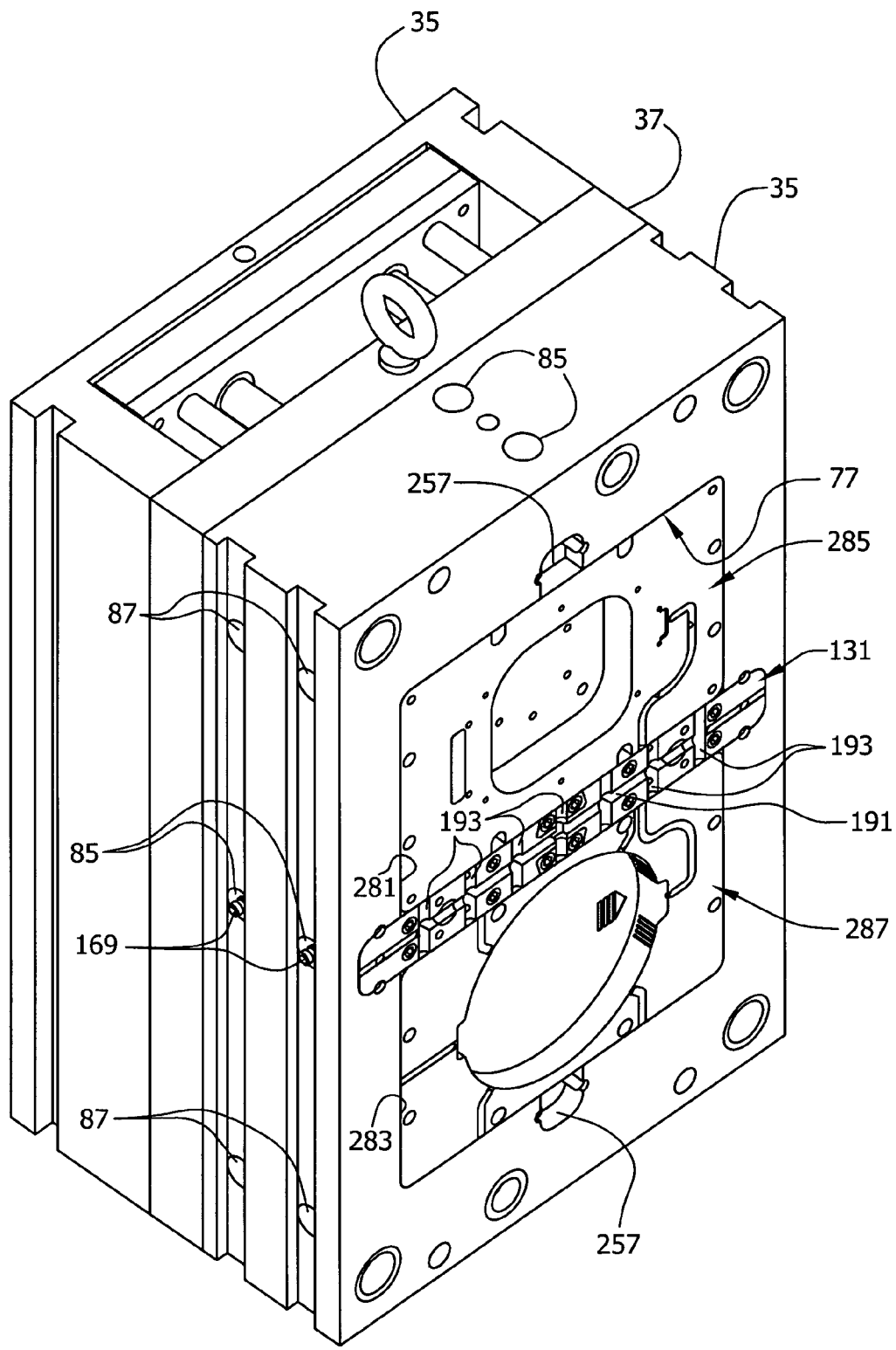
FIG. 12 is a perspective of the ejection side mold member having a different modular configuration of submolds.
Figure 13:
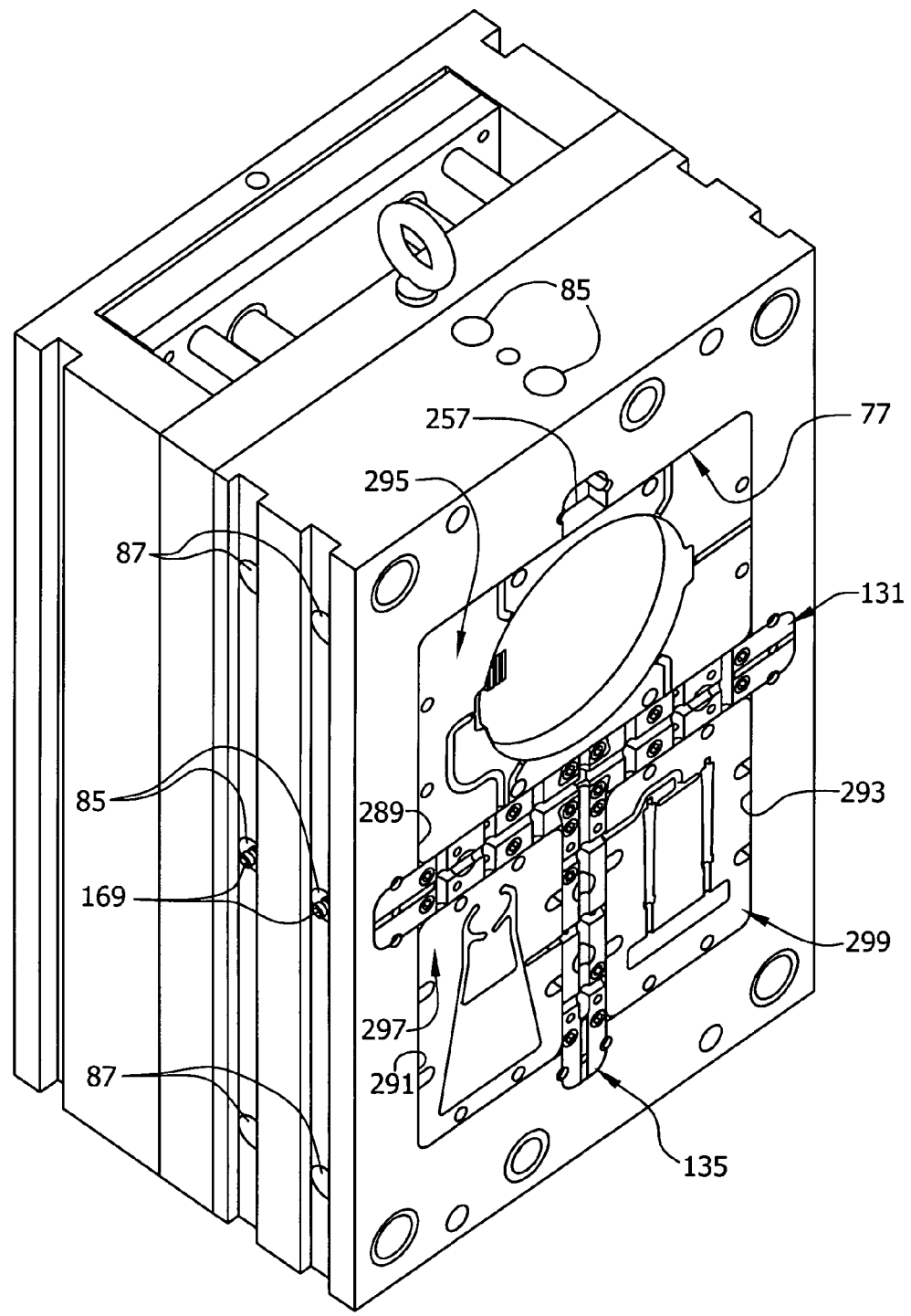
FIG. 13 is a perspective of the ejection side mold member having still another modular configuration of submolds.

In the embodiment of FIGS. 1-11, the primary partition 131 and secondary partitions 133, 135 are used to divide the submold receptacle 77 of the ejection side mold member 13 into the four sections 143, 145, 147, 149, receiving the four submolds 27, 29, 31, 33. FIG. 12 illustrates a configuration in which only the primary partition 131 is used, dividing the submold receptacle 77 into two sections 281, 283 containing two submolds, generally indicated at 285 and 287. As shown in FIG. 13, by using the primary partition 131 and one secondary partition 135 the mold receptacle 77 can be divided into three sections 289, 291, 293 holding three submolds, generally indicated at 295, 297, 299. It may be seen that the number of sections of the submold receptacle 77 can be changed not only along the length of submold receptacle, but also along its width (i.e., in directions which are perpendicular to each other). It is envisioned that within the scope of the present invention, partitions could be constructed so as to form other arrangements including greater numbers of mold receptacle sections for more submolds (not shown). Moreover, the ejection side mold member 13 could be used without any partitions 131, 133, 135, receiving a single submold (not shown) in its submold receptacle 77.

The partitions 137, 139, 141 of the static side mold member 15 have constructions which are very similar to the partitions 1 of the ejection side mold member 13 (FIG. 7). A main difference is that none of the partitions 137, 139, 141 of the static side mold member 15 has an ejector device. The mold 3 is designed in a way known to those of ordinary skill in the art so that the molded object and attached runners remain with the ejection side mold member 13 when the mold members 13, 15 are separated. The primary partition 137 of the static side mold member 15 includes a body 167c which is mounted directly on the clamp plate 89 and is supported by the clamp plate. The body 167c has internal coolant passages and two pairs of fittings 169c for communication with these passages. A runner channel plate 173c mounted on the body 167c may be made of the same or different material than the body. As shown, the runner channel plate 173c is made of steel and the body 167c is made of aluminum. The runner channel plate 173c has ends which are received in recesses 311 in the mold plate 93 for precise positioning. The primary partition 137 has a center passage 313 extending through the body 167c and the runner channel plate 173c which receives the sprue bushing 107. Thus, the sprue bushing 107 opens into the runner channels 191c, 193c of the primary partition runner channel plate 173c so that liquefied molding material flows into the runner channels. When the mold members 13, 15 are closed, the runner channels 191c, 193c of the primary partition 137 are aligned with the runner channels 191, 193 of the primary partition 131 of the ejection side mold member 13 to define completely enclosed passages in which the molding material may flow. The runner channel plate 173c further includes runner channel shutoff valves 197c for selectively closing off portions of the runner channels 191c, 193c from flow of molding material. The construction and operation of the shutoff valves 197c are the same as the shutoff valves 197 of the primary partition 131 of the ejection side mold member 13.

The secondary partitions 139, 141 of the static side mold member 15 each also include a body 167d, 167e and runner channel plate 173d, 173e, substantially as described for the secondary partitions 133, 135 of the ejection side mold member 13. The runner channel plates 173d, 173e are shaped at one end for reception in recesses 321 in the mold plate 93, and at an opposite end in a notch 259c in the primary partition runner channel plate 173c. The primary partition 137 and secondary partitions 139, 141 of the static side mold member 15 can be arranged in different ways, corresponding to the arrangements of the partitions 131, 133, 135 of the ejection side mold member 13 shown in FIGS. 11 and 12. The secondary partitions 139, 141 are also mounted directly on the clamp plate 89 for their support. Thus, there is no support panel 207 such as is present with the partitions 131, 133, 135 of the ejection side mold member 13. The secondary partitions 139, 141 each have an internal coolant passage (not shown) and two fittings 169d, 169e for liquid connection to the internal passage. Runner channels 191d, 193d, 191e, 193e in the runner channel plates 173d, 173e of the secondary partitions 139, 141 align with corresponding runner channels 191a, 193a, 191b, 193b in the secondary partitions 133, 135 of the ejection side mold member 13 to form enclosed passages. The runner channel plates 173d, 173e of the secondary partitions 139, 141 of the static side mold member 15 also have shutoff valves 197d, 197e to selectively close off portions of the runner channels 191d, 193d, 191e, 193e to molding material. The construction and operation of the shutoff valves 197d, 197e of the secondary partitions 139, 141 of the static side mold member 15 are the same as that of the shutoff valves 197, 197a, 197b of the primary and secondary partitions 131, 133, 135 of the ejection side mold member 13. It will be appreciated that the location of the shutoff valves 197c, 197d, 197e of the partitions 137, 139, 141 of the static side mold member 15 are aligned with the shutoff valves 197, 197a, 197b of the partitions 131, 133, 135 of the ejection side mold member 13.

Figure 17:
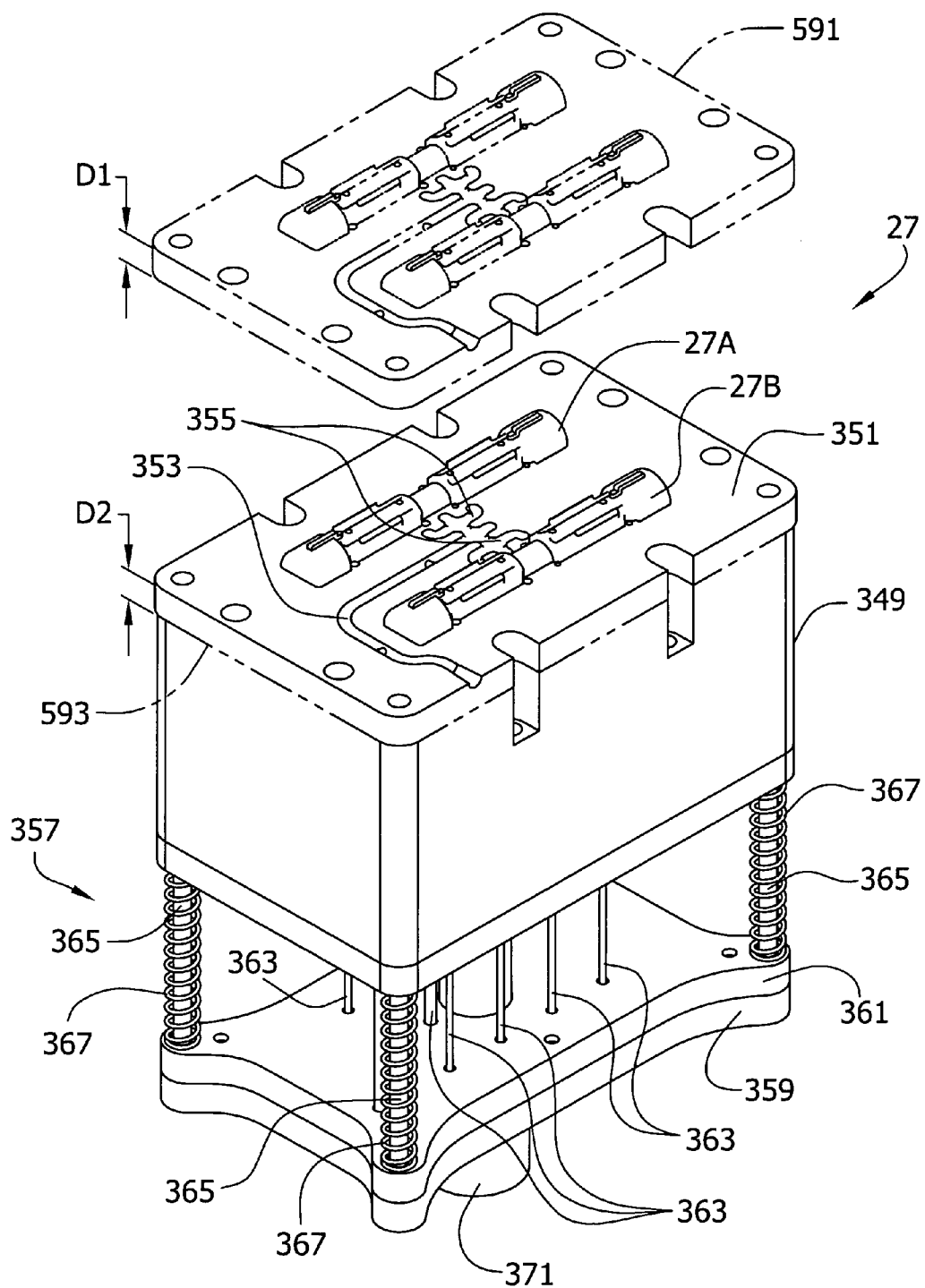
FIG. 17 is a perspective of a submold illustrating in phantom a portion of the submold cut away to a predetermined depth increment for subtractive reconditioning the submold and showing in phantom the predetermined depth for the next reconditioning of the submold.

Referring again to FIG. 2, the four submolds 27, 29, 31, 33 in the ejection side mold member 13 and the four submolds 97, 99, 101, 103 in the static side mold member 15 come in two general types. The first type of submold is represented by submold 27 which is shown in solid lines in FIG. 17, and also shown in FIG. 18. The phantom lines in FIG. 17 illustrate a method of subtractive reconditioning of the submold 27, which will be described hereinafter, but is not pertinent to the present description. Submold 27 is associated with the ejection side mold member 13 and comprises a unitary mold block 349, which in the illustrated embodiment is aluminum (e.g., FORTAL aluminum alloy). The material could be steel or another suitable material within the scope of the present invention. An upper surface 351 of the mold block 349 is formed with a cavity, or as is the case with the submold 27, two cavities 27A, 27B corresponding to the shape of approximately one half of an object to be molded. The submolds 31, 33 show examples where only single cavities (31A, 33A) for producing a single object are formed in the submolds. The upper surface 351 of the mold block 349 is formed with a runner channel 353 leading from an edge of the mold block where liquefied molding material is fed from the runner channel plate 173a into the mold block, and branch runner channels 355 leading from the runner channel to the respective cavities 27A, 27B.

The submold 27 has a third ejector device (generally indicated at 357) including an ejector bar plate 359 attached to a pin retainer plate 361. Ejection pins 363 are mounted on the ejector bar plate 359 and pin retainer plate 361 in the same way as described for the ejection pins 233 associated with the second ejector device 219. The ejection pins 363 extend through the pin retainer plate 361 and mold block 349 to openings in the cavities 27A, 27B and channels 353, 355 for pushing the object and connected runners out of the submold 27. Return pins 365 captured by the ejector bar plate 359 and pin retainer plate 361 extend through the mold block 349 to the upper surface 351 of the mold block. A coil spring 367 surrounds each return pin 365 and bears against the pin retainer plate 361 and the underside of the mold block 349, urging the ejector bar plate 359 back to a fully retracted position. As with the other return pins 233, the free ends of the pins 365 are flush with the upper surface 351 of the mold block 349 if the ejector bar plate 359 is fully retracted. If the ejector bar plate 359 is not fully retracted, the return pins 365 will engage a mating surface of the submold 97 associated with the static side mold member 15 and push the ejector bar plate (and hence all of the ejection pins) back to the fully retracted position.

The ejector bar plate 359 rests on the pin retainer plate 47 of the first ejector device 43. Thus, when the first ejector device 43 is actuated, the pin retainer plate 47 pushes the ejector bar plate 359 and pin retainer plate 361 of the third ejector device 357, causing the ejection pins 363 to push the object and runners out of the submold 27. When the ejector bar plate 45 of the first ejector device 43 is retracted, the coil springs 367 push the ejector bar plate 359 of the third ejector device 357 back to a retracted position so that the ejection pins 365 are substantially flush with bottoms of respective cavities 27A, 27B and/or channels 353, 355 in the mold block 349.

A support pillar 371 extends through the ejector bar plate 359 and pin retainer plate 361 into threaded engagement with the underside of the mold block 349. The opposite end of the support pillar 371 extends down through the pin retainer plate 47 and ejector bar plate 45 of the first ejector device 43 into engagement with the ejector housing 35. In this way a center portion of the submold 27 is supported directly by the ejector housing 35. Moreover, the support pillar 371 also connects the third ejector device 357 to the mold block. The lower end of the support pillar 371 is enlarged so that the ejector bar plate 359 rests on the support pillar, and the top end is fastened to the mold block 349, attaching the third ejector device 357 to the mold block. As stated previously, the submold 27 also rests on ledges 71 associated with the support plate 37, ledges 225 of the primary partition 131 and ledges 223a of the secondary partition 133, which support the submold under the loads experienced during pressurized injection of molding material in the molding process. The submold 27 is attached to the ledges 71, 223a, 225 on which it is supported. In some instances, where the distance spanned by the mold block 349 between supporting ledges 71, 225 is relatively short, the support pillar 371 is not necessary.

Submolds 31 and 33 have a similar construction as the submold 27, particularly in that they have their cavities 31A, 33A formed in respective, one piece mold blocks. Similarly, the corresponding submolds 97, 101, 103 associated with the static side mold member 15 also have their cavities 97A, 97B, 101A, 103A formed in unitary mold blocks. The mold blocks of the submolds 97, 101, 103 of the static side mold member 15 are attached directly to the clamp plate 89 of the static side mold member and are supported by the clamp plate.

Figure 15:
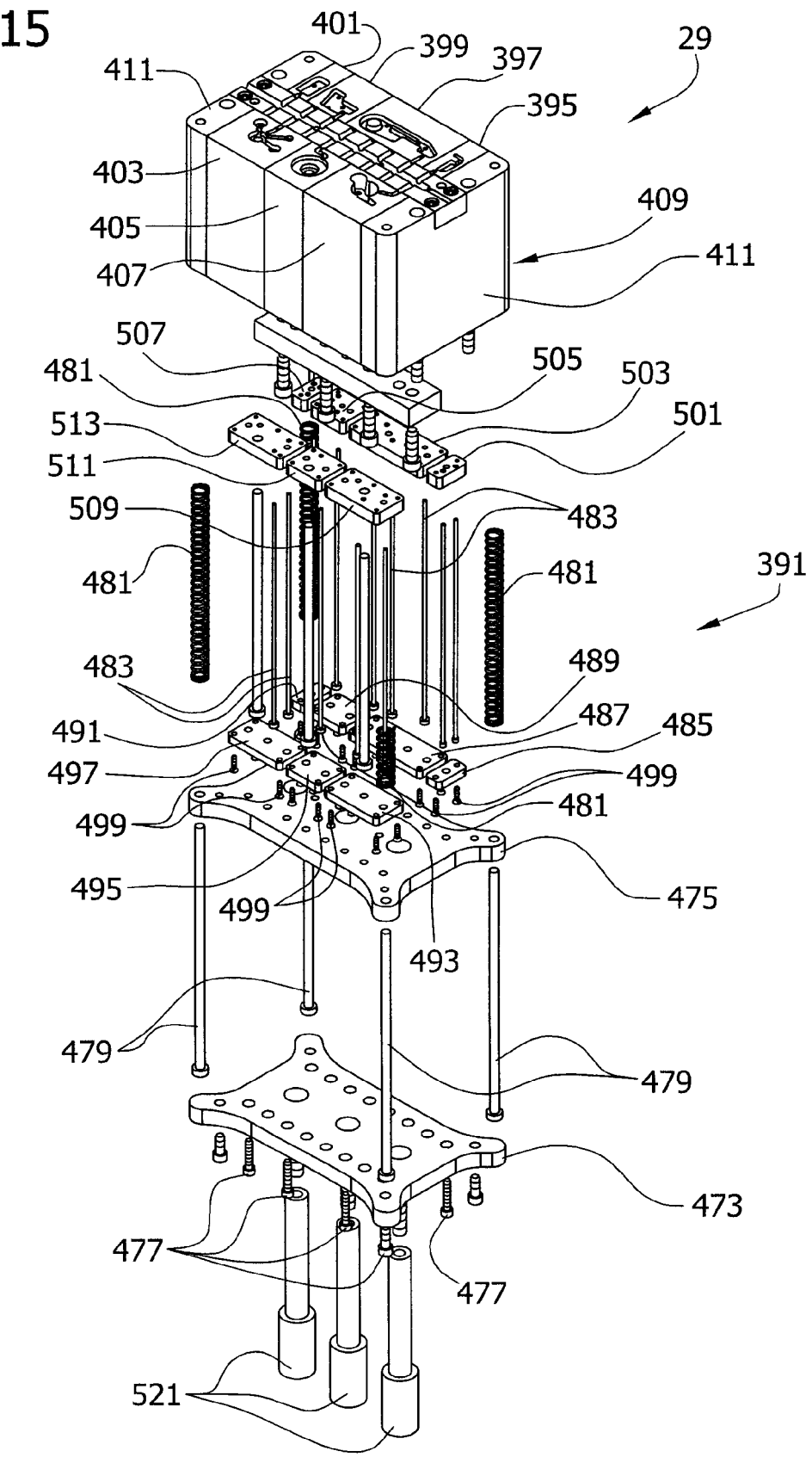
FIG. 15 is a partially exploded perspective of a submold of the submolds shown in FIG. 14 associated with the ejection side mold member.
Figure 16:
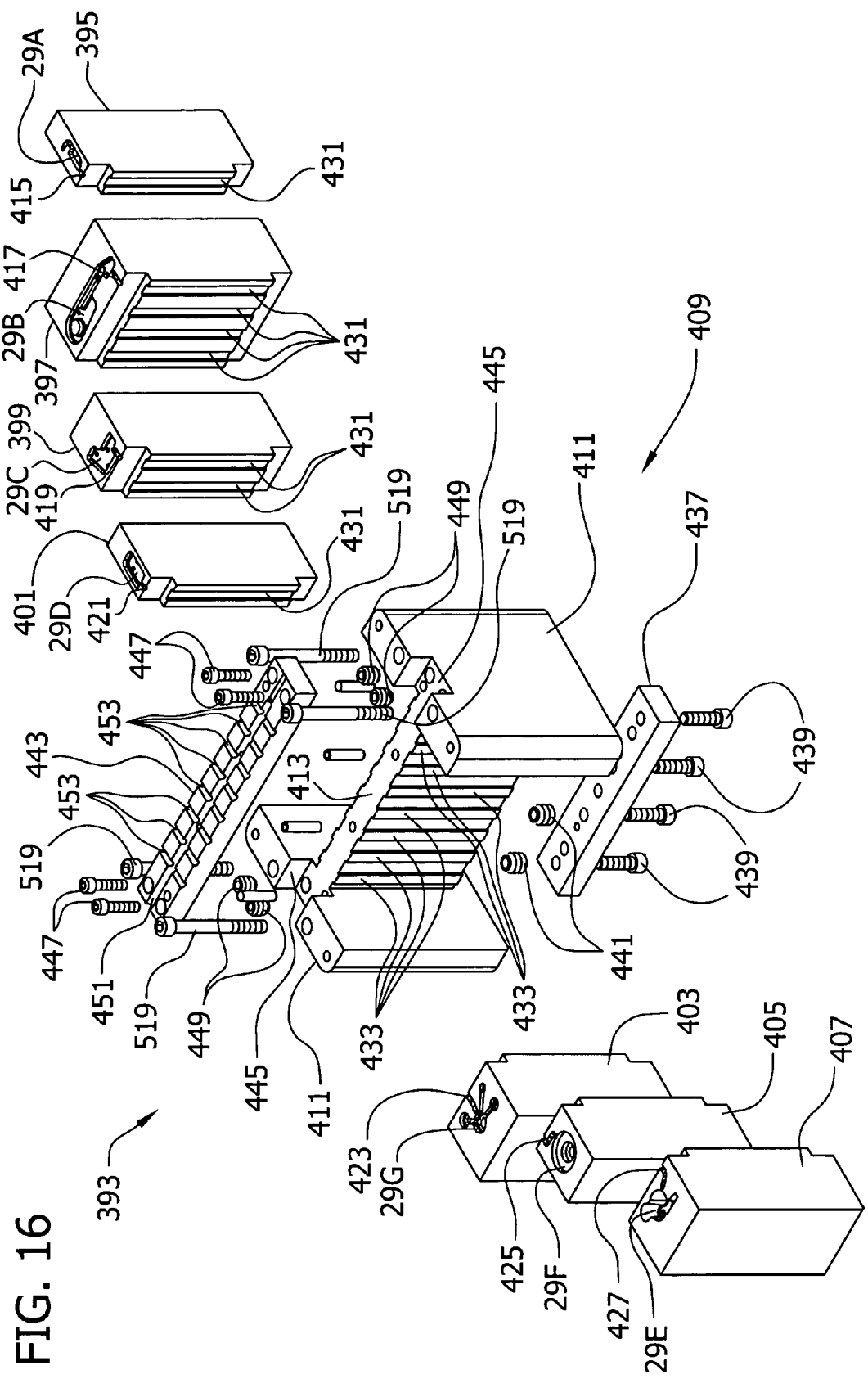
FIG. 16 is a portion of the submold of FIG. 15 showing submold components exploded from the frame.

The second type of submold is represented by the submold 29, which is shown in more detail in FIGS. 15 and 16. The submold 29 is associated with the ejection side mold member 13 and has a fourth ejector device 391. The submold 29 further includes a mold block (generally indicated at 393), which instead of being a unitary piece of material, comprises modular submold components 395, 397, 399, 401, 403, 405, 407 attached to a generally H-shaped frame (generally indicated at 409) including end pieces 411 and a center beam 413. Each of the submold components 395, 397, 399, 401, 403, 405, 407 is a solid block of material (e.g., FORTAL aluminum alloy) into which is formed a respective one of the cavities 29A-29G, corresponding to (approximately) one half of the object to be formed, and a runner channel 415, 417, 419, 421, 423, 425, 427. One or more grooves 431 on one side of the submold components 395, 397, 399, 401, 403, 405, 407 (only some of the grooves may be seen in the drawings) receive a corresponding number of tongues 433 (only some are shown) formed on the center beam 413 to precisely locate the submold components relative to the frame 409 (FIG. 16). The submold components 395, 397, 399, 401, 403, 405, 407 are made in widths of a fixed increment. Thus, the submold component 399 or 405 with two grooves is twice as wide as the submold component 395 having one groove, the submold component 403 having three grooves is three times as wide as the single groove submold component 395, and the submold component 397 having four grooves is four times as wide. Submolds (not shown) as large as the one entire side of the center beam 413 are contemplated. Thus within the submold 29, there is substantial flexibility as to the sizes of the objects which can be produced. However, the flexibility is achieved within the context of submold components 395, 397, 399, 401, 403, 405, 407 of predetermined sizes. A range of submold component blanks (not shown, but like the illustrated submold components 395, 397, 399, 401, 403, 405, 407 without a cavity or runner channels) can be provided for use in constructing the particular submold components to be used. A retainer plate 437 mounted by bolts 439 on the underside of the center beam 413 of the frame 409 is used for retaining the submold components 395, 397, 399, 401, 403, 405, 407 on the frame. The bolts 439 are received in inserts 441 screwed into the center beam 413. The inserts 441 protect the frame material (e.g., FORTAL aluminum alloy) from premature wear cause by fastening and releasing the bolts 439.

A runner channel plate 443 is mounted on top of the center beam 413 and is received in cutouts 445 in the end pieces 411. Bolts 447 used to mount the runner channel plate 443 are also received in inserts 449 screwed into the end pieces 411 to protect the frame 409 from wear. The runner channel plate 443 cooperates with the retainer plate 437 to retain the submold components 395, 397, 399, 401, 403, 405, 407 on the frame. A longitudinal runner channel 451 of the runner channel plate 443 communicates with a transverse runner channel 193 of the primary partition 131 to receive liquefied molding material. Certain transverse runner channels 453 of the runner channel plate 443 are aligned with the runner channels 415, 417, 419, 421, 423, 425, 427 of the submold components 395, 397, 399, 401, 403, 405, 407 to deliver molding material to the submold components. Other transverse runner channels 453 are blocked by abutting portions of the submold components 395, 397, 399, 401, 403, 405, 407 away from the runner channels 415, 417, 419, 421, 423, 425, 427. The runner channel plate 443 is one which is not particularly dedicated to a particular arrangement of submold components 395, 397, 399, 401, 403, 405, 407, but can be used with different arrangements of submold components, including other submold components that are not illustrated.

The fourth ejector device 391 is similar to the third ejector device 357, but has a modular construction to conform to different arrangements of submold components making up the submold 29. As shown in FIG. 15, the fourth ejector device 391 includes an ejector bar plate 473 and a pin retainer plate 475 secured to the ejector bar plate by bolts 477. Return pins 479 extend through the end pieces 411 of the submold frame 409. Coil springs 481 are received around the return pins 479 between the pin retainer plate 475 the end pieces 411 of the frame 409. The coil spring 481 in the foreground of FIG. 15 has been mostly broken away to add clarity to the drawing. The return pins 479 function exactly the same way as the return pins 365 of the third ejector device 357. Ejection pins 483 have heads which are retained between the pin retainer plate 475 and modular retainer plates 485, 487, 489, 491, 493, 495, 497 mounted on the pin retainer plate by screws 499.

The ejection pins 483 extend up through modular ejector guides 501, 503, 505, 507, 509, 511, 513 that are received in pockets (not shown) formed on the undersides of respective submold components 395, 397, 399, 401, 403, 405, 407. The smallest modular retainer plate 485 and ejection guide 501 correspond to the submold component 395 which is one base increment wide and has one groove 431. Another modular retainer plate 495 and ejector guide 511 correspond to the submold component 405 which is two base increments wide, and so on. These modular retainer plates 485, 487, 489, 491, 493, 495, 497 and ejector guides 501, 503, 505, 507, 509, 511, 513 can be variously positioned on the pin retainer plate 475 as needed to arrange ejection pins 483 corresponding to the particular submold component with which the ejection pins need to operate. If the submold components are changed, then the ejection pins 483, modular retainer plates 485-497 and modular ejection guides 501-513 can be changed. The fourth ejector device 391 functions in the same way as the third ejector device 357 to eject the objects formed in the cavities 29A-29G of the various submold components 395, 397, 399, 401, 403, 405, 407 of the submold 29.

The submold 29 is secured by pairs of fasteners 519 on each end to a ledge 71 on the support plate 37 and to another ledge 225 on the primary partition 131. Sides of the submold 29 are supported by another ledge 71 of the support plate 37 and one of the ledges 223a of the secondary partition 133. In addition, three support pillars 521 extend through the ejector bar plate 473 and pin retainer plate 475 into engagement with the underside of the submold 29 on the retainer plate 437. The retainer plate translates the support of the support pillars 521 to all of the submold components 395, 397, 399, 401, 403, 405, 407. The opposite ends of the support pillars 521 slidably extend through the pin retainer plate 47 and ejector bar plate 45 and rest directly on the ejector housing 35. Thus, the support pillars 521, ledges 71 of the support plate 37 and ledges 223, 223a of the partitions 131, 133 cooperate to support the submold 29 against the loads applied to the submold as a result of pressurized injection of molding material during the molding operation. The support pillars 521 also function to attach the fourth ejector device to the frame 409 of the mold block 393.

Figure 14:
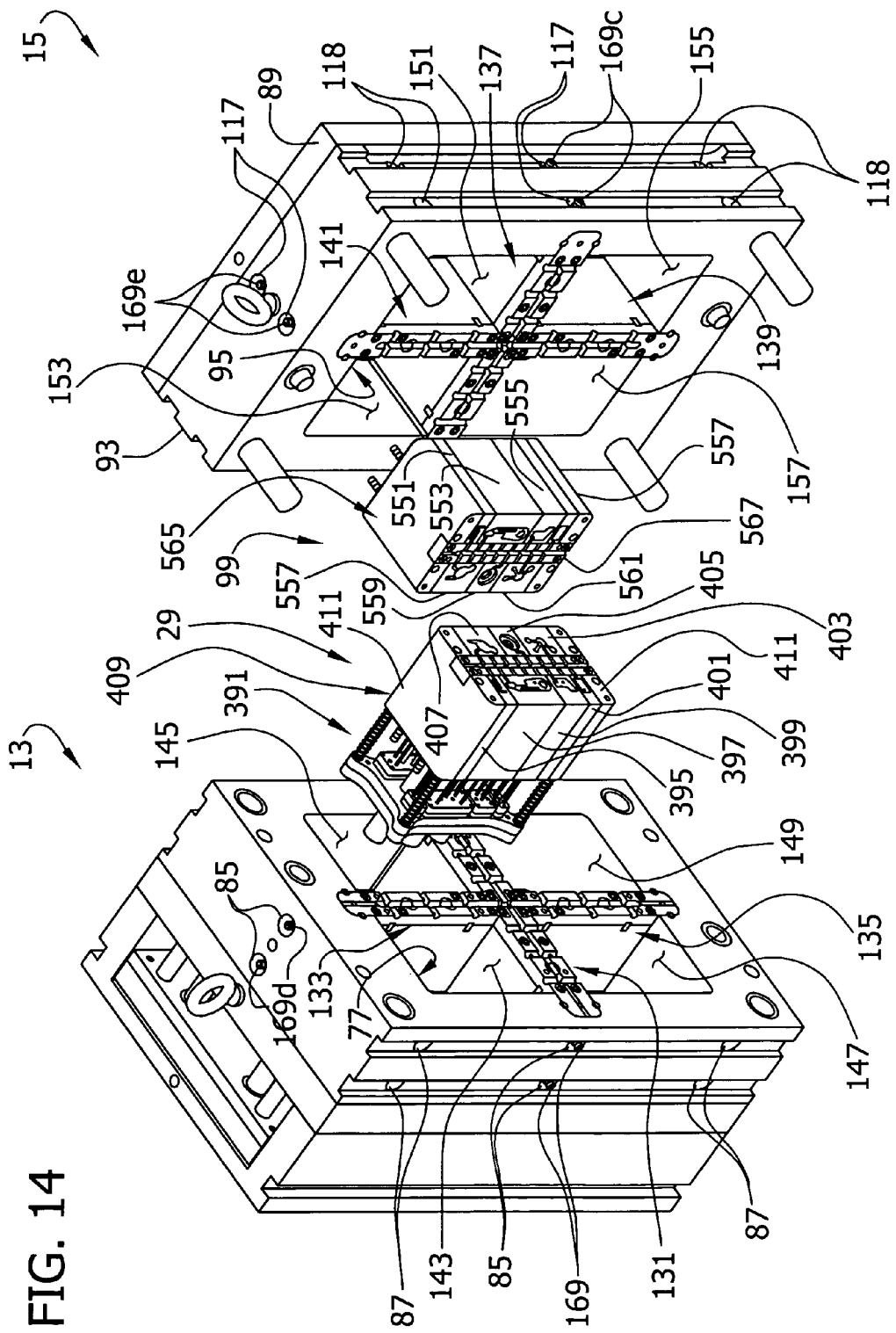
FIG. 14 is a perspective of the ejection side and static side mold members shown apart from each other and submolds including multiple mold components exploded from respective mold members.

Referring to FIG. 14, the corresponding submold 99 associated with the static side mold member 15 has a construction substantially similar to that of the submold 29 associated with the ejection side mold member 13. The submold 99 includes modular submold components 551, 553, 555, 557, 559, 561, 563 which are mounted on a frame indicated generally at 565. A runner channel plate 567 acts to direct molding material to the various submold components 551-563 in the same way as the runner channel plate 443. However, the submold 99 of the static side mold member 15 does not have an ejector device like the fourth ejector device 391. The submold 99 is attached directly to and supported by the clamp plate 89. The submold 99 mates with the submold 29 of the ejection side mold member 13 to enclose molding volumes defined by mating cavities 29A-29G and 99A-99G, and runner passages defined by mating runner channels of the runner channel plates 443 and 567. The mold 3 of the present invention thus provides for modularity by allowing for different arrangements of submolds, and also by having a modular submold which can be configured and reconfigured for molding different objects.

Over time, the submolds (and in particular the mold blocks and submold components) become worn and/or break in use, and are not capable of producing acceptable objects. It is well known to recondition mold blocks which are worn or damaged by cutting away a layer of the block which contains the wear or damage ("subtractive reconditioning"). The mold members 13, 15 are removed from the plastic injection molding machine 1, the submold or submolds are taken out of the mold members and the mold blocks (or submold components) are removed from any remaining ancillary structure of the submolds. Typically, the mold blocks are placed in a computer numerical controlled (CNC) machine capable of cutting off (or otherwise removing) material from the submold upper surfaces. The CNC machine is capable of accessing electronic data regarding the original configuration of the submold. The original acquisition of this data may be part of a virtual cavity or virtual mold existing in electronic form that was created from customer product specifications in electronic form. The minimum amount of material that can be taken off of the upper surface of each mold block is determined by ascertaining how much material needs to be removed to eliminate damage and cause all surfaces of the mold cavities to be exposed and freshly cut.

In the method of the present invention, the depth of the cut is not arbitrary or peculiar to any one mold block, but is selected from a predetermined minimal cut depth increment and multiples of that increment. For instance in a preferred embodiment, the increment is 0.0625 inches, but other increments could be selected without departing from the scope of the present invention. A predetermined depth D1 of cut removed from a reconditioned mold block 349 is illustrated in FIG. 17 by the exploded upper surface section 591 shown above the mold block in phantom lines. In practice, the removed upper surface section 591 would not be cut away as a unit as shown, but has been illustrated as a cohesive unit for purposes of showing the cut depth D1. The depth D1 of the section 591 has been greatly exaggerated in proportion to the size of the mold block 349 in this drawing so that it is more easily seen. The phantom line 593 below the existing upper surface 351 illustrates the depth D2 to which the next cut will be made for subtractive reconditioning the mold block 349.

As shown, D2 is the same depth as the amount D1 previously cut away. However, the depth D2 of the next cut could be a multiple of the first cut D1 (assuming the first cut was to a depth equal to the minimum increment). The precise depth of the cut would be determined when the damage to the upper surface 351 is evaluated at the beginning of the next subtractive reconditioning of the mold block 349.

Once the mold block upper surface has been cut to the predetermined depth and a new surface is exposed, a determination is made as to how the upper surface 351 will be finished. Almost always, the upper surface 351 is reformed with the same cavity (cavities 27A, 27B) as previously formed in the mold block 349. The data for reforming the upper surface 351 of the mold block 349 is obtained from the aforementioned virtual cavity information. The data can be fed directly to a controller of a CNC machine (not shown) that reproduces the cavity and other features automatically. However, the data could also be used for a manual reconditioning of the mold block, or some combination of manual and automated reconditioning. If the cavity (e.g., cavities 27A, 27B) is to be reconditioned by bead blasting or other abrasive method, then a temporary protective layer (not shown) is placed at the depth of the mold parting line of the reconditioned mold block upper surface 351 prior to the onset of reconditioning of the cavity (i.e., after the predetermined increment of thickness has been cut away from the upper surface). After the cavity is reconditioned, the protective layer is removed. Abrasive reconditioning may damage the sharp edges of the cavities at the parting line surface (i.e., the upper surface 351). Thus after abrasive reconditioning, the mold block 349 may be returned to the CNC machine to sharpen the edges and form the upper surface 351 for close registration with the upper surface of the mating submold.

Figure 18:
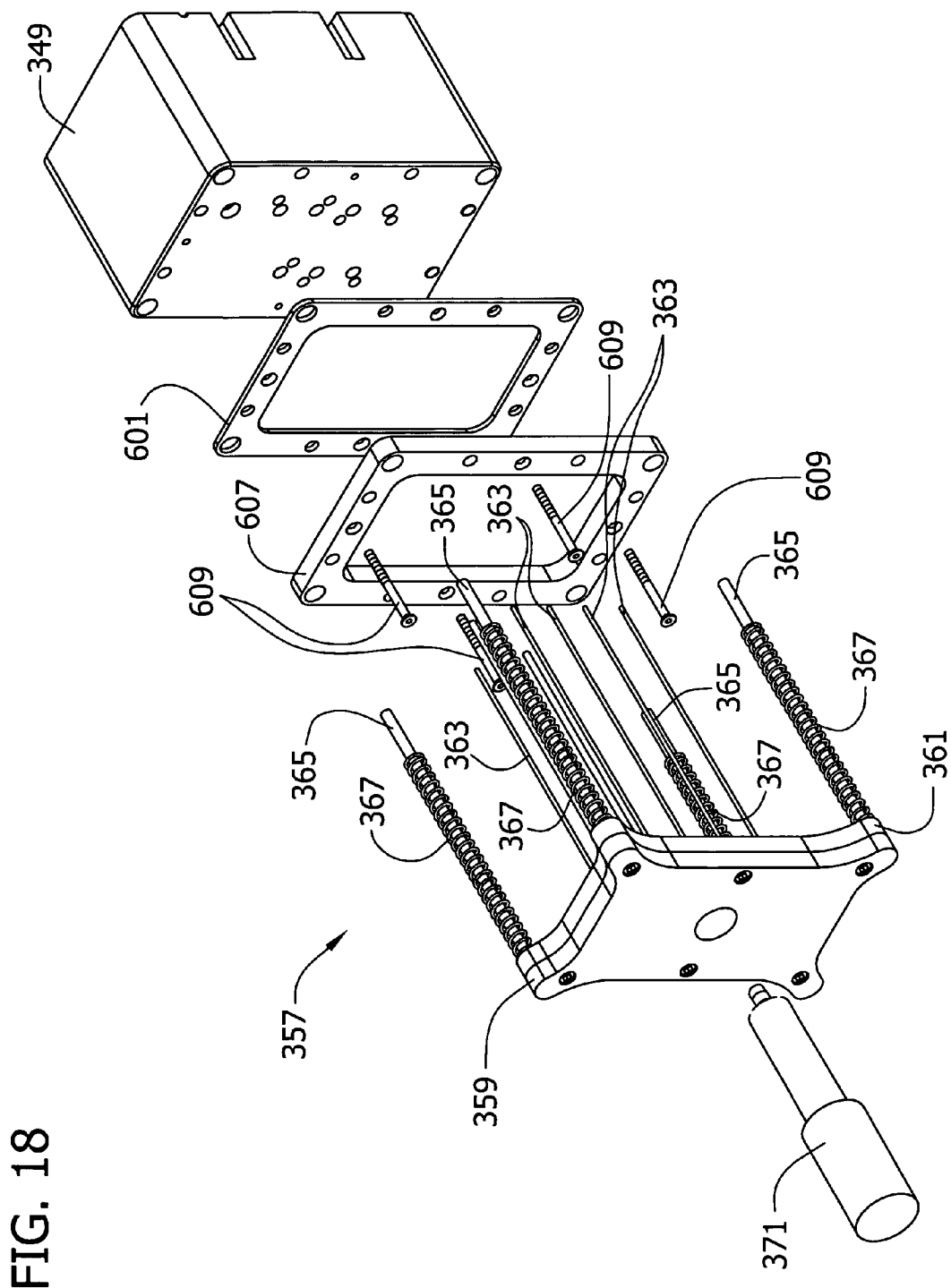
FIG. 18 is an exploded perspective of the submold of FIG. 17 seen from the underside and showing spacers used with the reconditioned submold.
Figure 19:
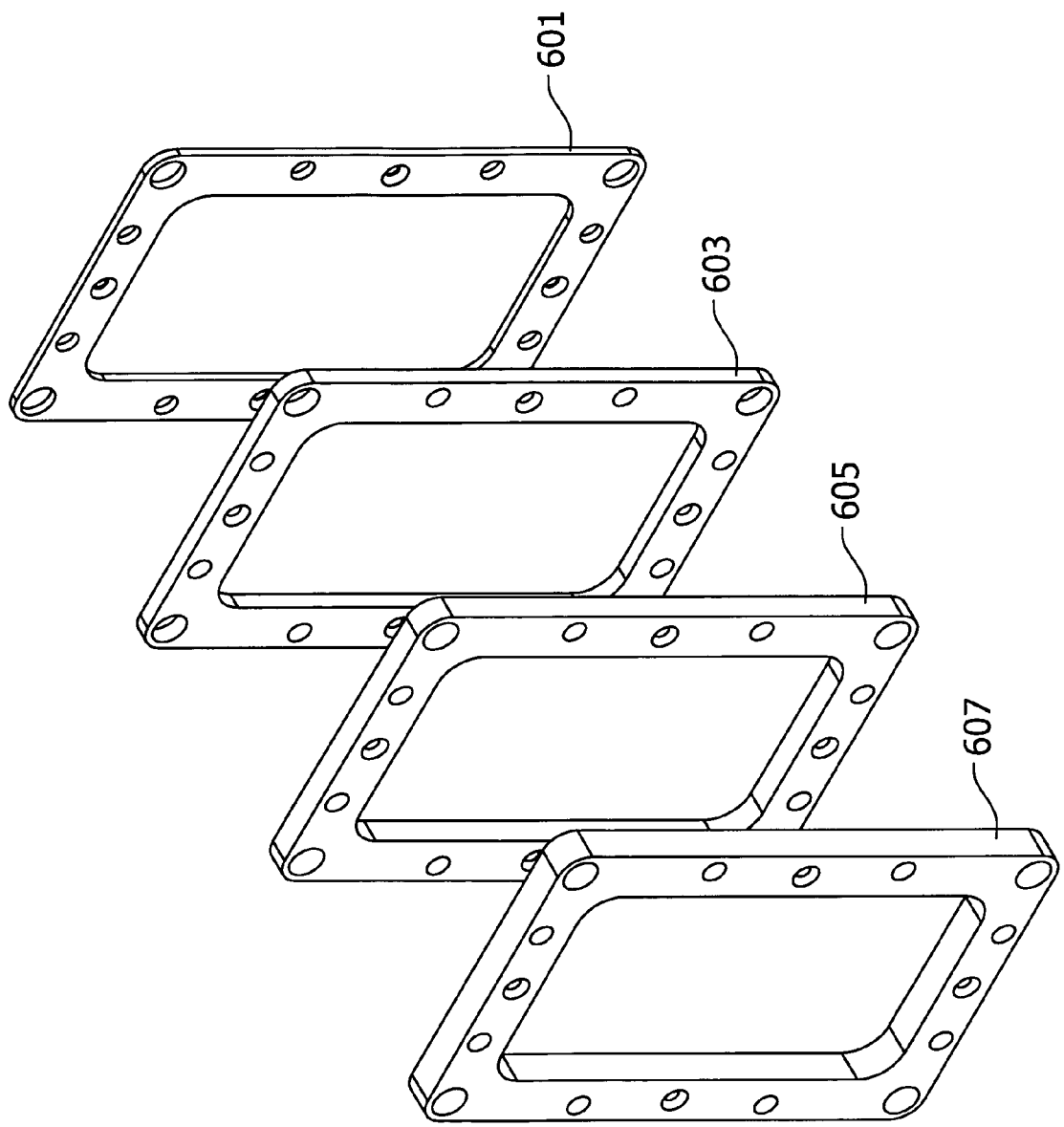
FIG. 19 is a perspective of a series of the spacers.

The reconditioned mold block 349 is not, by itself, suitable for use in the submold because it is now shorter and would not register with the plane of the mold face 63 of the mold plate 39. Moreover, the travel of the ejection pins would not be proper for the reduced height of the reconditioned mold block. In order to compensate for the loss of height, a preconstructed set of shims (designated 601, 603, 605, 607) is provided (FIG. 19). The number and thickness of shims 601-607 shown in FIG. 19 are exemplary only. The same set of shims 601-607 would be used for the mold blocks of all submolds of any mold constructed according to the illustrated embodiment. The shims 601-607 come in thicknesses which correspond to the amount of the incremental cut depth of the mold block. In other words, the shims in the illustrated embodiment come in thicknesses of 0.0625 and multiples thereof. The particular shim 601-607 which is selected depends upon the total depth of material which has been removed from the upper surface 351 of the mold block 349 after all subtractive reconditioning procedures. Multiple shims can be selected to equal the total depth of material removed. As is shown in FIG. 18, two shims 601 and 607 of different thicknesses (e.g., 0.250 inch and 0.0625 inch) are used with the mold block 349 in the reconditioned submold 27. The shims 601, 607 are attached by bolts 609 on the underside of the mold block 349 so that as assembled in the submold 27, the mold block will extend up to the same height it did originally, prior to removal of any material from the upper surface 351. Although the shims 601-607 are shown as closed loops of material, they may be formed by one or more distinct segments of material (not shown) mounted on the underside of the mold block 349.

Typically, the shims 601-607 are made of a harder material than the mold block 349. However, when the material of the shims 601-607 is different, the amount of thermal expansion among the different submolds in the mold member 13 or 15 may be different. The expansion differentials may be unacceptable in some circumstances. By considering factors such as the coefficient of thermal expansion of each material, the viscosity of molding material, injection pressure of mold material and range of operation temperatures, a maximum ratio of height of shims of differing material to the existing mold block height can be determined. If the ratio will be exceeded by using a single shim having a thickness corresponding to the full thickness of material removed from the mold block, then two shims can be used (e.g., shims 601 and 607, as shown in FIG. 18). The thinner shim 601 would be made of the harder material and the thicker shim 607 would be made of the same material as the mold block 349 (e.g., FORTAL aluminum alloy). The thicker shim 607 would have to be thick enough so that the ratio of the thickness of the thinner shim 601 of harder material to the thickness of the mold block material (now including the thickness of the thicker shim 607) was below the maximum allowed.

Ejection pins 365 and other submold parts are individually measured to determine whether reconditioning is needed. Often, these other parts are constructed of a hardened material and require reconditioning less frequently. If the pins 365 are found to be excessively worn, they are replaced. Guide holes for the pins are also measured for wear. If excessive wear in the guide holes is found, the holes are reconditioned. Either larger ejection pins are used for the guide holes of now larger diameter, or inserts (not shown) are placed in the guide holes so that the same ejection pins can be used.

The mold 3 of the present invention retains the flexibility for the customer to reconfigure the mold should market conditions require, for instance, a larger number of objects to be produced in a given time. If a higher output of objects is needed, it is not necessary to construct an entirely new mold. Instead, the virtual cavity can be used to create additional submolds that are received in the same mold plate. A different number of partitions can be used to provide more submold receptacle sections to receive a greater number of submolds. In addition, or as an alternative, the submold with submold components can be reconfigured to make more parts. In any event, the customer does not have to incur the full costs associated with creating an entirely new mold. Of course, if all available space in the mold plate is already filled, the cost of making a new mold will have to be incurred. However, even then the pre-existence of the virtual cavity data will make the construction of the second mold more efficient and less costly than with conventional molds.

Figure 20:
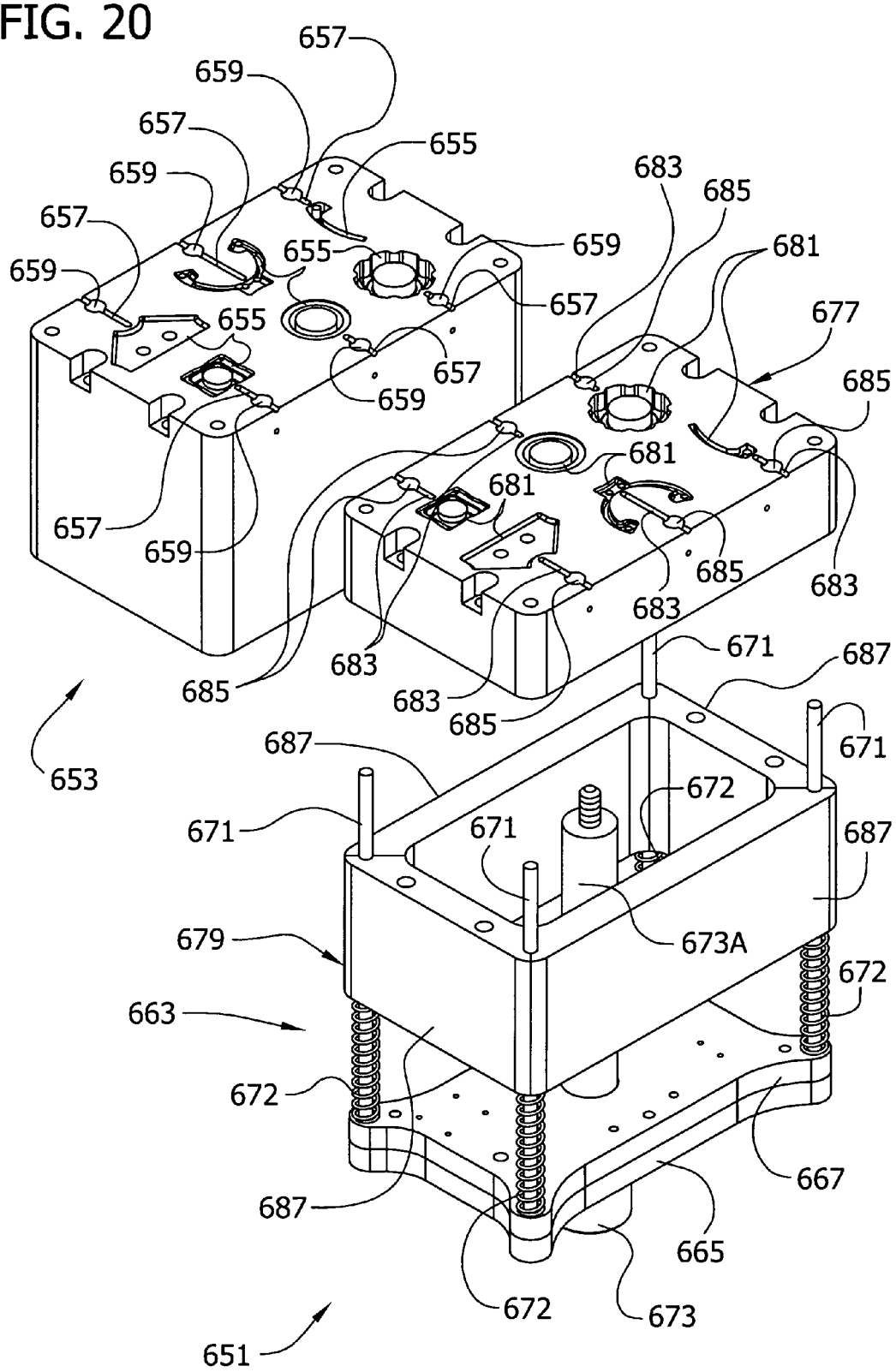
FIG. 20 is a perspective of an ejection side, variable height submold of another embodiment, partially exploded and next to a mating static side submold.

Referring now to FIG. 20, mating pairs of submolds of a second embodiment are shown to comprise an ejection side submold 651 and a static side submold 653 (the reference numerals designating their subjects generally). The submolds 651, 653 are shown side-by-side rather than in opposed relation as they would be in use. The static side submold 653 has substantially the same construction as the static side submolds 97, 99, 101 and 103 of the first embodiment and can be mounted directly on the clamp plate 89 of the static side mold member 15. The static side submold 653 has multiple cavities 655 each having an associated runner channel 657 and runner channel shutoff valve 659. The ejection side submold 651 is similar to the ejection side submolds 27, 29, 31, 33, except that it has a modular height feature, as will be described. The ejection side submold 651 includes a fifth ejector device (generally indicated at 663) comprising an ejector bar plate 665, a pin retainer plate 667, ejection pins 669, return pins 671 (FIG. 22) and return springs 672. A support pillar 673 extends through the ejector bar plate 665, pin retainer plate 667 and attaches to the underside of the cavity block 677. In addition to providing support for the submold 651 in use, the support pillar 673 attaches the fifth ejector device 663 the submold.

The submold 651 further includes a mold block 675 comprising a cavity block 677 and a modular wall 679 (all numerals indicating their subjects generally). The cavity block 677 is made of a solid piece of material and has cavities 681 formed in it for shaping a portion of a molded object. The cavity block 677 is also formed with runner channels 683 and corresponding runner channel shutoff valves 685. The wall 679 engages the underside of the cavity block 677. When placed in the submold receptacle 77 of the mold member 13, the underside of the wall 679 engages support ledges 71, 223a, 225 of the support plate 37, the primary portion 131 and one of the secondary partitions 133, 135 that may be mounted in the submold receptacle 77 (not shown in FIGS. 21-24). The wall 679 comprises multiple (four in the illustrated embodiment) wall members 687 that form a rectangle with an open center (see FIG. 22). The wall members 687 engage respective ledges 71, 223a, 225 and are secured to the ledges by threaded fasteners. It will be understood that the number of wall members 687 making up the wall 679 can be other than described without departing from the scope of the present invention. Moreover, the wall may be formed by a solid block of material.

Figure 21:
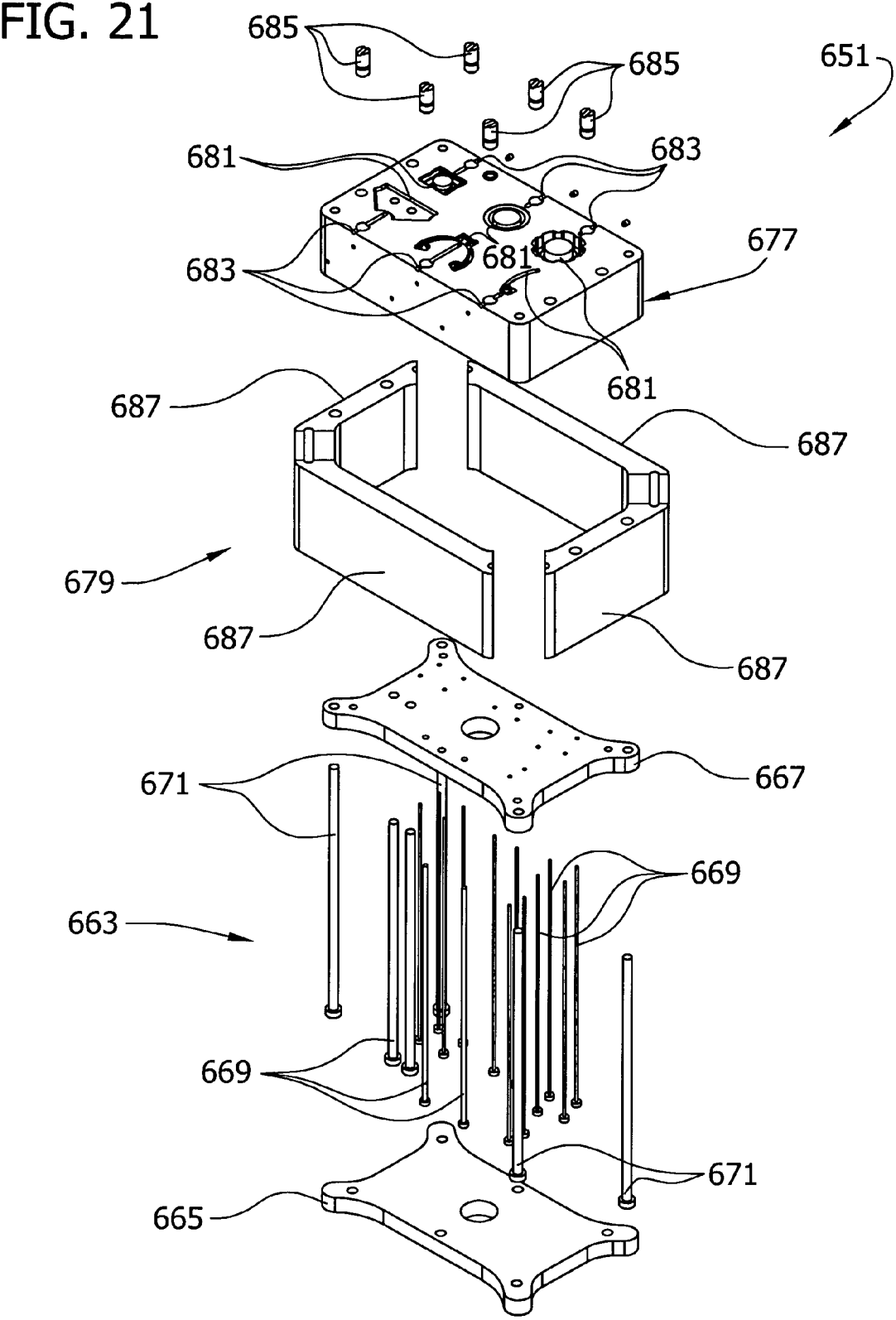
FIG. 21 is an exploded perspective of the ejection side submold of FIG. 20.
Figure 23:
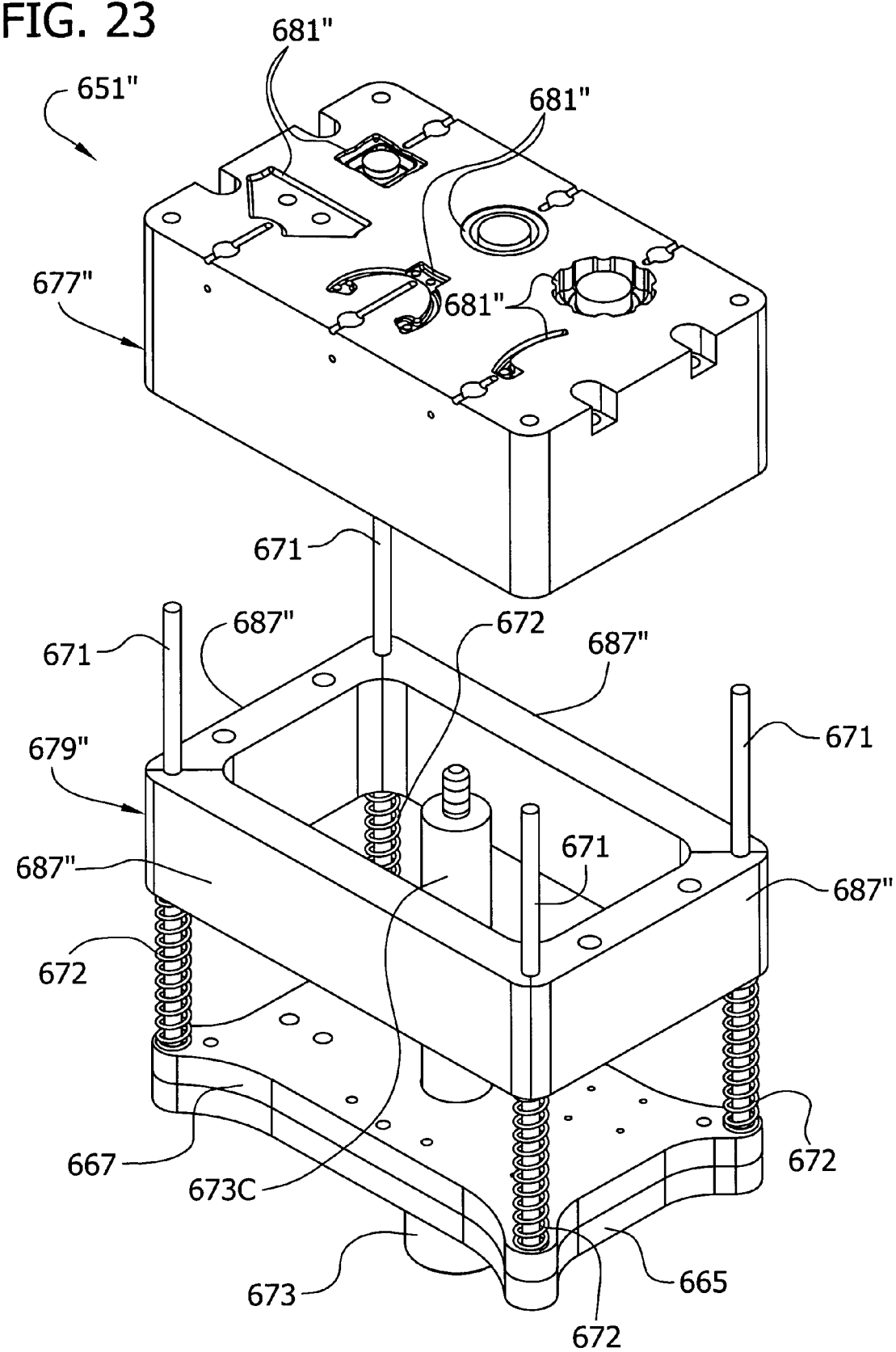
FIG. 23 is a perspective of an ejection side submold of a different height than the submolds of FIGS. 20 and 22.
Figure 24:
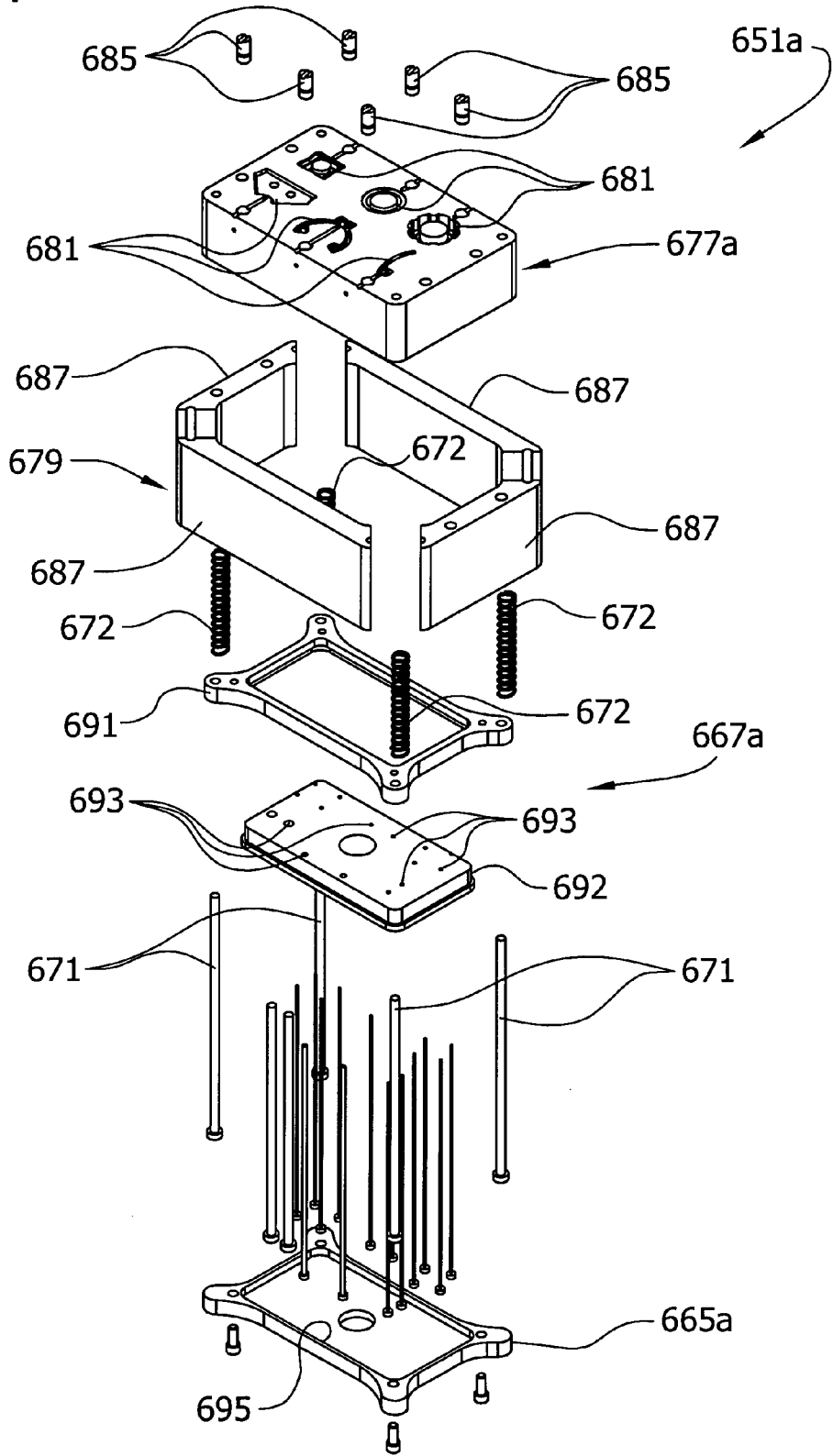
FIG. 24 is an exploded perspective of a different version of a variable height submold.

Referring to FIGS. 23 and 24, the same basic assembly is used to construct submolds (designated 651' and 651", respectively) having cavity blocks 677', 677" of different heights. Although each cavity block 677, 677', 677" has the same arrangement of cavities 681, 681', 681", cavity blocks having different cavities may be (and most likely would be) used in the different submolds. The cavity block 677' of submold 651' shown in FIG. 23 is thicker than the cavity block 677 of the submold 651 of FIG. 21. Accordingly, the wall 679' has wall members 687' which are shorter so that the overall height of the submold remains the same. FIG. 24 illustrates the submold 651" having a thinner cavity block 677" than the cavity block 677 of the submold 651 (FIG. 21). The wall 679" of submold 651" is higher than the wall 679 of submold 651 to compensate for the difference. Again, the overall height of the submold 651" remains the same as the submold 651 through use of different modular wall members 687". When the objects to be molded are small and only relatively shallow mold cavities are required in the cavity block, it is permissible to use thinner cavity blocks. The walls 679, 679', 679" use less material (e.g., aluminum) than a solid mold block, and therefore is less costly to construct. The same walls 679, 679', 679" can be used with many different cavity blocks (not shown). Moreover, none of the walls 679, 679', 679" are used when the cavity block (not shown) is the full height. The support pillars 673, 673', 673" have extensions 673A, 673B, 673C corresponding to the heights of the respective walls 679, 679', 679" so that the support pillars can extend to the cavity blocks 677, 677', 677". Only a minimum of material must be dedicated to any particular cavity block. Similar modular walls could be used for submolds (not shown) mounted on the static side mold member 15 without departing from the scope of the present invention.

Figure 22:
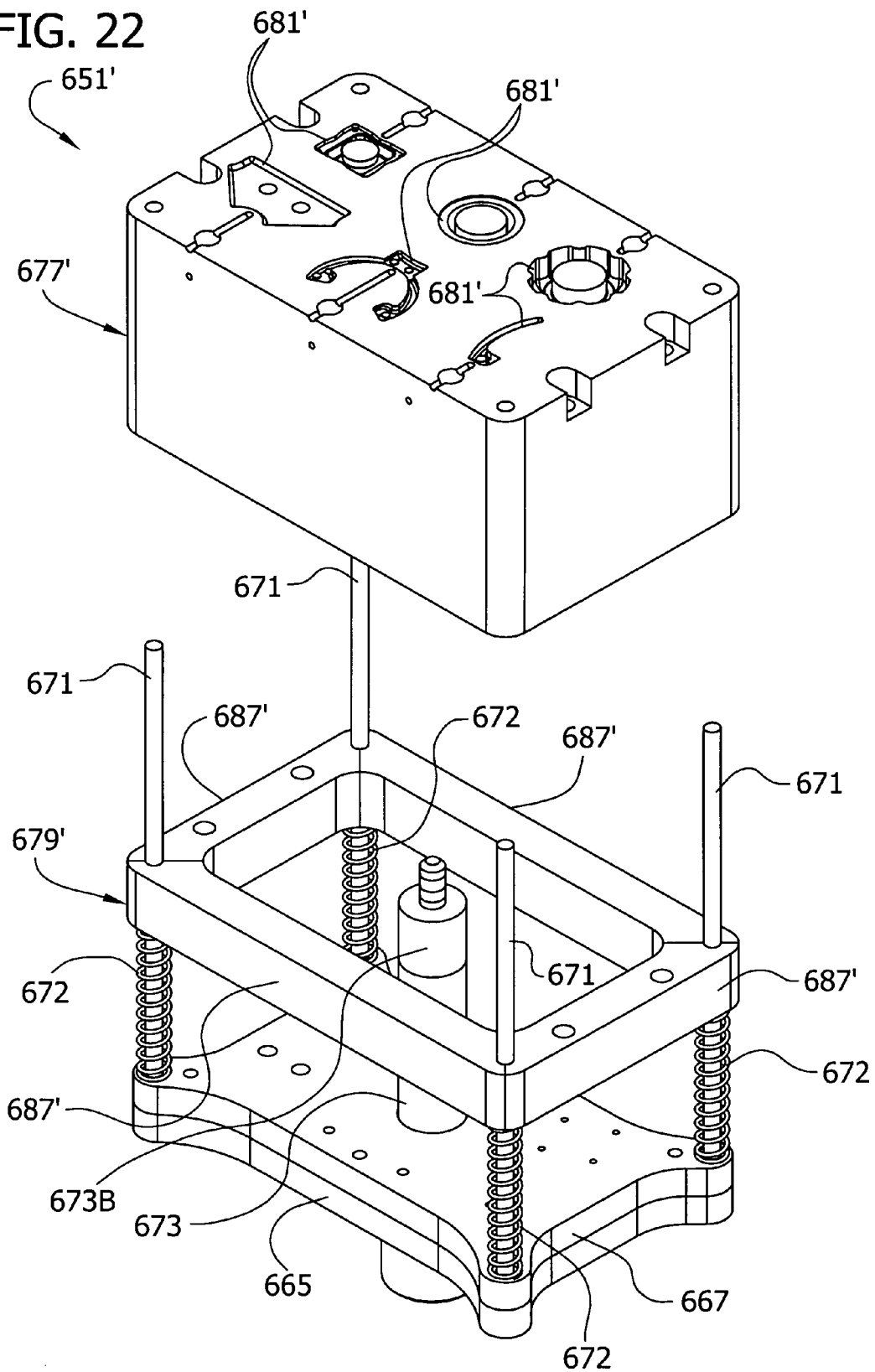
FIG. 22 is a perspective of an ejection side submold of a height different from the submold of FIG. 20.

FIG. 25 illustrates a modified version of the submold of FIGS. 21 and 22. The same parts from FIGS. 21 and 22 are indicated by the same reference numerals. A modified ejector bar plate 665a and pin retainer plate 667a are indicated by the same reference numerals plus the letter "a". More specifically, the pin retainer plate 667a comprises a frame 691 and a center portion 692 that can be separated from the frame. The center portion 692 has pin guide holes 693 which line up with the ejection holes (not shown) in the cavities 681a of the particular cavity block 677a used in the submold 651a. The ejector bar plate 665a has a center recess 695 what receives part of the center portion 692 when the plates 665a, 667a are assembled in use. Thus, the parts of the submold 651a other than the cavity block 677 are completely modular for use with other cavity blocks (not shown) having different arrangements of cavities.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require and particular orientation of the item described.

As various changes could be made in the above without departing from the scope of the invention, it is intended that all matter contained in the above description and shown in the accompanying drawings shall be interpreted as illustrative and not in a limiting sense.

The invention claimed is:

1. A mold member cooperable with at least one other mold member for forming a mold capable of receiving fluidized material into the mold for molding objects from said material, the mold member comprising:
   a plate having an opening therein defining a mold insert receptacle;
   a mold insert adapted for insertion into the mold insert receptacle, the mold insert comprising a frame and plural mold insert components, at least some of the mold insert components having a cavity therein for receiving fluidized material to mold at least a portion of an object, the mold insert components being adapted for releasable attachment to the frame to form the mold insert;
   a support plate having a central opening and ledges located for engaging the mold insert at a peripheral edge thereof for supporting the mold insert; and partitions capable of being received in the mold insert receptacle for dividing the mold insert receptacle into sections, and at least one of the partitions having a ledge adapted to support the mold insert.

2. A mold member cooperable with at least one other mold member for forming a mold capable of receiving fluidized material into the mold for molding objects from said material, the mold member comprising:
   a plate having an opening therein defining a mold insert receptacle;
   a mold insert adapted for insertion into the mold insert receptacle, the mold insert comprising a frame and plural mold insert components, at least some of the mold insert components having a cavity therein for receiving fluidized material to mold at least a portion of an object, the mold insert components being adapted for releasable attachment to the frame to form the mold insert; and plural mold inserts, the plate being adapted to receive the mold inserts in the mold insert receptacle in at least two arrangements which differ in the number of mold inserts along two nonparallel directions within the mold insert receptacle.

3. A mold member cooperable with at least one other mold member for forming a mold capable of receiving fluidized material into the mold for molding objects from said material, the mold member comprising:
   a plate having an opening therein defining a mold insert receptacle;

a mold insert adapted for insertion into the mold insert receptacle, the mold insert comprising a frame and plural mold insert components, at least some of the mold insert components having a cavity therein for receiving fluidized material to mold at least a portion of an object, the mold insert components being adapted for releasable attachment to the frame to form the mold insert; and at least one partition selectively mountable on the plate in the mold insert receptacle for defining, in combination with the plate, mold insert receptacle sections.

4. A mold member as set forth in claim 3 wherein the partition has a thermal transfer system for use in exchanging thermal energy with at least one of the mold inserts in the mold insert receptacle.

5. A mold member as set forth in claim 4 wherein the plate has a thermal transfer system, and wherein the mold insert has at least two sides, one of the two sides engaging the plate for thermal energy transfer with the thermal transfer system of the plate and the other of the two sides engaging the partition for thermal energy transfer with the thermal transfer system of the partition.

6. A mold member as set forth in claim 3 wherein the partition is one of plural partitions capable of being selectively arranged in the mold insert receptacle to define sections for receiving respective ones of the mold inserts.

7. A mold member as set forth in claim 6 wherein the partitions are capable of being selectively arranged in the mold insert receptacle in plural arrangements in which the number of sections formed by the partitions among the arrangements differ along two nonparallel directions in the mold insert receptacle.

8. A mold member as set forth in claim 7 wherein the sections defined by the partitions in the mold insert receptacle are larger than the mold insert to be received in the sections when the mold insert is at a room temperature, and at a higher operating temperature at least one of the mold insert and partitions expanding to bring the mold insert and partitions into contact for conductive heat transfer between the mold insert and partitions.

\* \* \* \* \*

UNITED STATES PATENT AND TRADEMARK OFFICE
CERTIFICATE OF CORRECTION

PATENT NO.        : 7,497,677 B1                                          Page 1 of 1
APPLICATION NO. : 10/936268
DATED             : March 3, 2009
INVENTOR(S)       : Crain et al.

It is certified that error appears in the above-identified patent and that said Letters Patent is hereby corrected as shown below:

Column 26, claim 8, line 11: "claim 7" should read -- claim 6 --.

Signed and Sealed this

Twelfth Day of January, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,497,677 B1 | Page 1 of 1 |
| APPLICATION NO. | : 10/936268 | |
| DATED | : March 3, 2009 | |
| INVENTOR(S) | : Crain et al. | |

It is certified that error appears in the above-identified patent and that said Letters Patent is hereby corrected as shown below:

On the Title page of the patent, Item 12: "Crian et al." should read -- Crain et al. --.

On the Title page of the patent, Item 75, Inventors:
"Stephen B. Crian, Cape Girardead, MO (US)" should read
-- Stephen B. Crain, Cape Girardeau, MO (US) --.

Signed and Sealed this
Fourteenth Day of June, 2011

David J. Kappos
*Director of the United States Patent and Trademark Office*